(12) United States Patent
Stimm

(10) Patent No.: US 9,194,371 B2
(45) Date of Patent: *Nov. 24, 2015

(54) WIND TURBINE

(71) Applicant: Kean W. Stimm, Williamsville, NY (US)

(72) Inventor: Kean W. Stimm, Williamsville, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/633,937

(22) Filed: Feb. 27, 2015

(65) Prior Publication Data

US 2015/0184635 A1 Jul. 2, 2015

Related U.S. Application Data

(63) Continuation of application No. 13/221,656, filed on Aug. 30, 2011, now Pat. No. 9,004,864, which is a continuation-in-part of application No. PCT/US2010/039487, filed on Jun. 22, 2010.

(60) Provisional application No. 61/269,183, filed on Jun. 22, 2009, provisional application No. 61/402,451, filed on Aug. 30, 2010.

(51) Int. Cl.
*F03D 7/02* (2006.01)
*F03D 9/00* (2006.01)

(52) U.S. Cl.
CPC .............. *F03D 7/0276* (2013.01); *F03D 7/028* (2013.01); *F03D 7/0272* (2013.01); *F03D 9/002* (2013.01)

(58) Field of Classification Search
CPC ... F03D 1/0666; F03D 1/0675; F03D 1/0641; F03D 1/0683; F03D 1/0633; F03D 7/0276; F03D 7/028; F03D 7/0272; F03D 9/002; F05B 2240/30; F05B 2250/232; F05B 2260/902

See application file for complete search history.

(56) References Cited

U.S. PATENT DOCUMENTS

| | | | |
|---|---|---|---|
| 4,021,135 A | 5/1977 | Pedersen et al. | |
| 4,140,433 A | 2/1979 | Eckel | |
| 4,150,301 A | 4/1979 | Bergey, Jr. | |
| 4,611,125 A | 9/1986 | Stone | |
| 4,619,585 A | 10/1986 | Storm | |
| 4,632,636 A | 12/1986 | Smith | |
| 4,720,640 A | 1/1988 | Anderson et al. | |
| 5,326,225 A * | 7/1994 | Gallivan et al. | 416/179 |

(Continued)

FOREIGN PATENT DOCUMENTS

| | | |
|---|---|---|
| CN | 1234096 A | 11/1999 |
| DE | 712532 C | 11/1941 |

(Continued)

*Primary Examiner* — Dwayne J White
*Assistant Examiner* — William Grigos
(74) *Attorney, Agent, or Firm* — Michael L. Dunn

(57) ABSTRACT

A wind turbine having a set of curved blades mounted on a central rotatable hub. Each of the blades has a defined pitch angle, to a rotational axis of the hub, along the blade from the hub to the tip. A curve is provided on the wind contact surface along each of the blades over the blade surface from the leading edge of the blade to the trailing edge of the blade by an amount between about 6 and about 24 degrees. The defined pitch angle from any point along the leading edge of the blade being defined by the arc-sine of a ratio of blade velocity to apparent wind velocity, with a variance of ±30 percent of the complementary angle to the arc-sine; and apparatus for varying the velocity of the blade to control power output so that it is within fifteen percent of maximum obtainable power of the blade most distant from the hub.

20 Claims, 10 Drawing Sheets

(56) References Cited

U.S. PATENT DOCUMENTS

| | | | |
|---|---|---|---|
| 5,393,199 A * | 2/1995 | Alizadeh | 416/189 |
| 5,525,037 A | 6/1996 | Cummings | |
| 6,042,333 A | 3/2000 | Day | |
| 6,065,937 A * | 5/2000 | Hunt | 416/189 |
| 6,241,474 B1 * | 6/2001 | Alizadeh et al. | 416/189 |
| 6,287,078 B1 * | 9/2001 | Min et al. | 416/189 |
| 6,368,061 B1 * | 4/2002 | Capdevila | 416/169 A |
| 6,786,697 B2 | 9/2004 | O'Connor et al. | |
| 7,042,110 B2 * | 5/2006 | Mikhail et al. | 290/44 |
| 7,116,006 B2 | 10/2006 | McCoin | |
| 7,214,029 B2 | 5/2007 | Richter | |
| 7,362,004 B2 | 4/2008 | Becker | |
| 7,396,207 B2 | 7/2008 | DeLong | |
| 7,550,864 B2 * | 6/2009 | Anderson et al. | 290/55 |
| 7,775,760 B1 * | 8/2010 | Finnell | 415/4.3 |
| 8,021,100 B2 | 9/2011 | Presz, Jr. et al. | |
| 9,004,864 B2 * | 4/2015 | Stimm | 416/27 |
| 2002/0076327 A1 * | 6/2002 | Houten | 416/189 |
| 2003/0223858 A1 | 12/2003 | O'Connor et al. | |
| 2003/0227174 A1 | 12/2003 | Bayly | |
| 2004/0160063 A1 | 8/2004 | Le Nabour et al. | |
| 2004/0247438 A1 | 12/2004 | McCoin | |
| 2006/0244264 A1 | 11/2006 | Anderson et al. | |
| 2008/0315585 A1 * | 12/2008 | Marvin | 290/44 |
| 2010/0329870 A1 * | 12/2010 | Farb | 416/179 |

FOREIGN PATENT DOCUMENTS

| | | |
|---|---|---|
| DE | 804090 C | 4/1951 |
| DE | 2715729 A1 | 10/1978 |
| FR | 1290018 A | 4/1962 |
| SU | 1740767 A1 | 6/1992 |
| WO | 8707328 A1 | 12/1978 |
| WO | 9623140 A1 | 8/1996 |

* cited by examiner

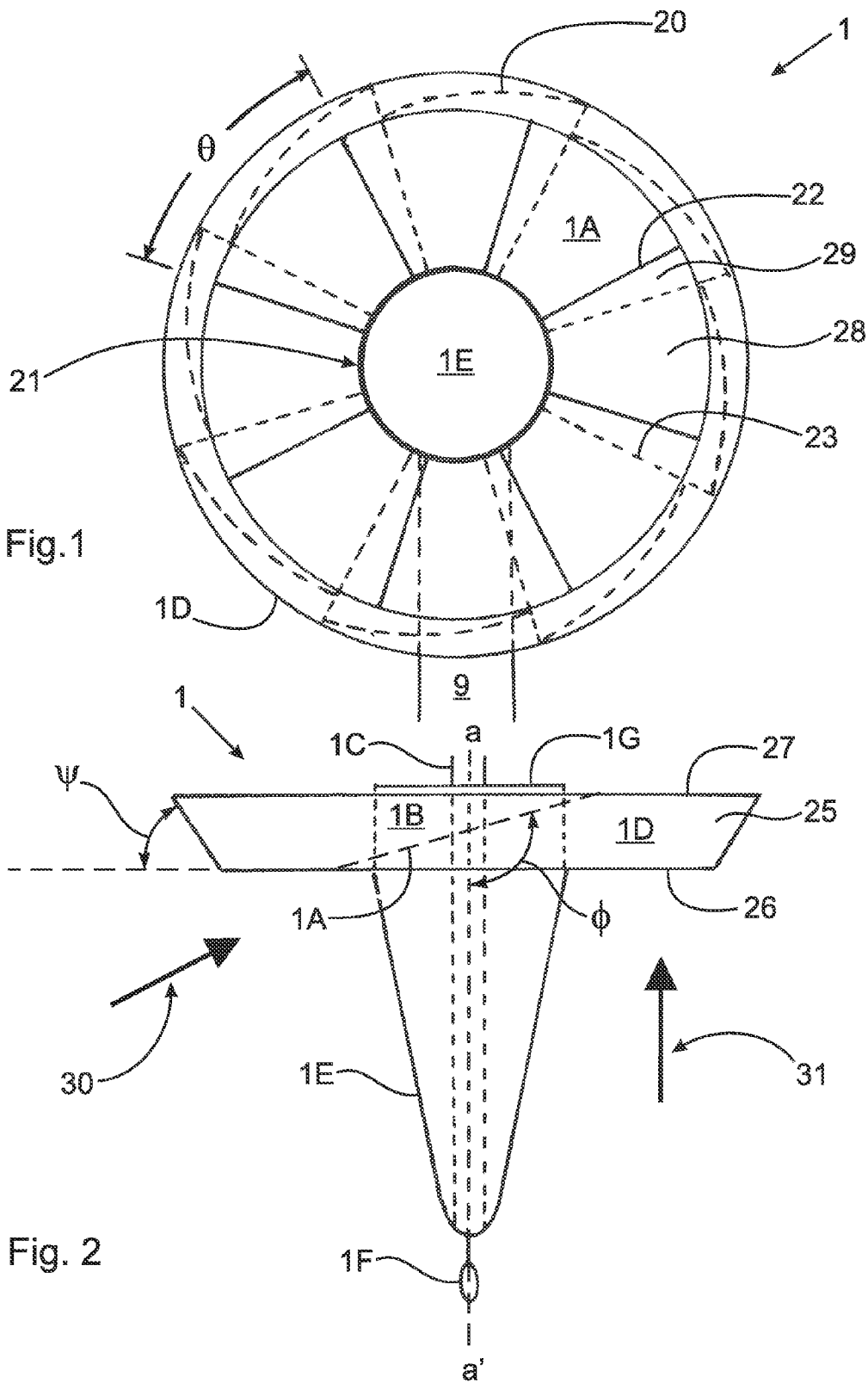

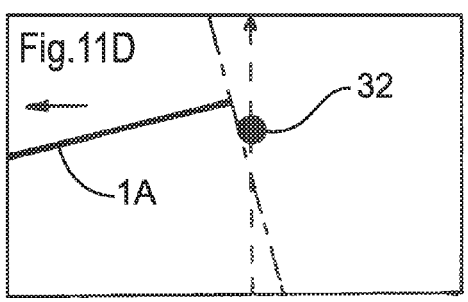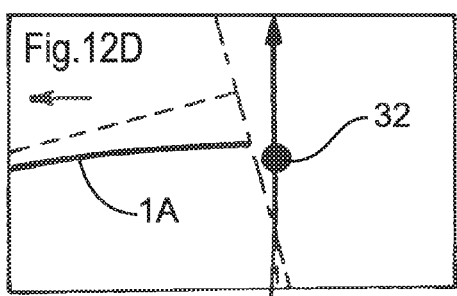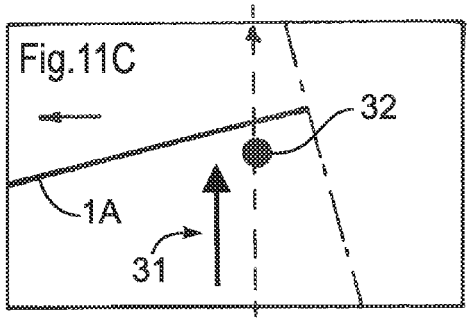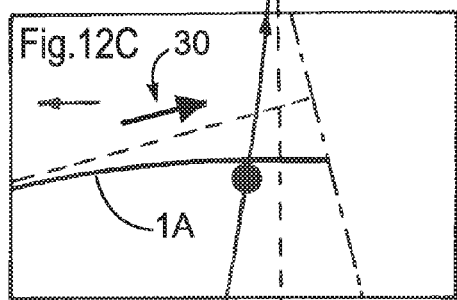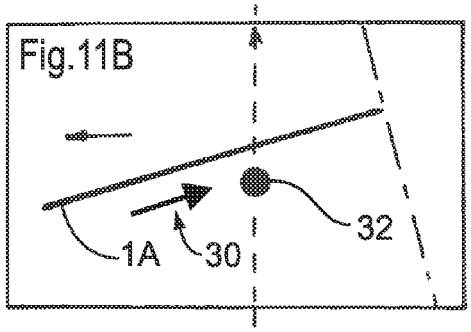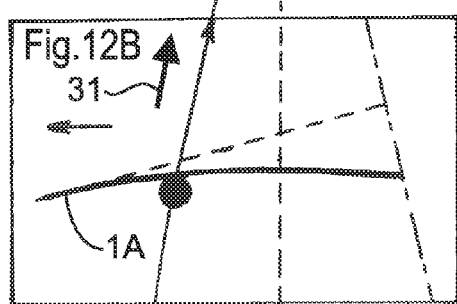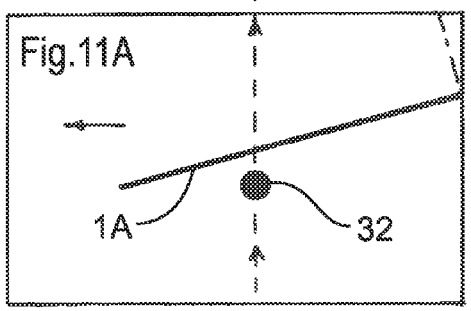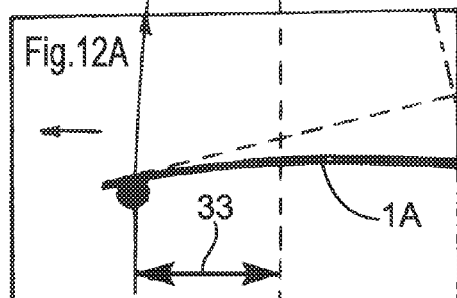

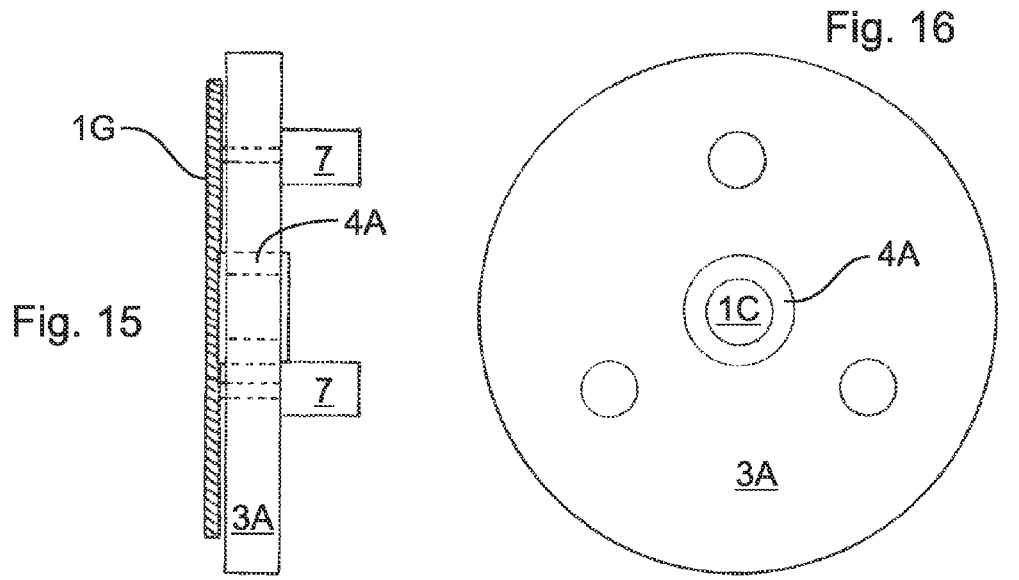
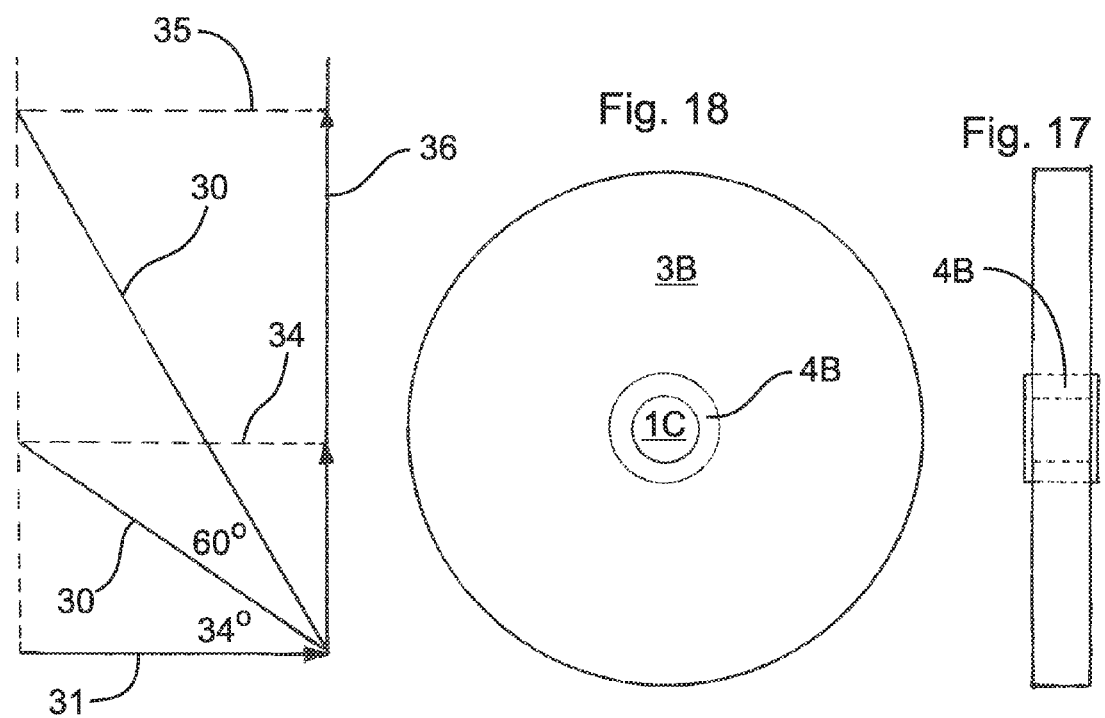

1. TWV = 10 MPH, BV = 10 MPH

TAN∂ = 10/10 = 1   ∂ = 45.000.0 degrees

2. TWV = 10 MPH, BV = 20 MPH

TAN∂ = 20/10 = 2.0   ∂ = 63.4349 degrees

3. TWV = 10 MPH, BV = 30 MPH

TAN∂ = 30/10 = 3.0   ∂ = 71.5651 degrees

4. TWV = 10 MPH, BV = 40 MPH

TAN∂ = 40/10 = 4.0   ∂ = 75.9638 degrees 5-1. TWV = 20MPH, BV = 10MPH

TAN∂ = 10/20 = .5   ∂ = 26.5651 degrees 5-2. TWV = 20 MPH, BV = 20 MPH

TAN∂ = 20/20 = 1.0   ∂ = 45.0000 degrees 5-3. TWV = 20 MPH, BV = 30 MPH

TAN∂ = 30/20 = 1.50   ∂ = 56.3099 degrees 5-4. TWV = 40/20 = 2.0   ∂ = 63.4349 degrees 6-1. TWV = 30 MPH, BV=10 MPH TAN∂ = 10/30 = .333   ∂ = 18.4178 degrees 6-2. TWV = 30 MPH, BV = 20MPH TAN∂ = 20/30 = .667   ∂ = 33.7033 degrees 6-3. TAN∂ = 30/30 = 1.0   ∂ = 45.0000 degrees 6-4. TAN∂ = 40/30 = 1.333   ∂ = 53.1232 degrees

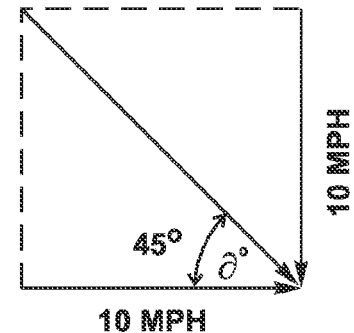

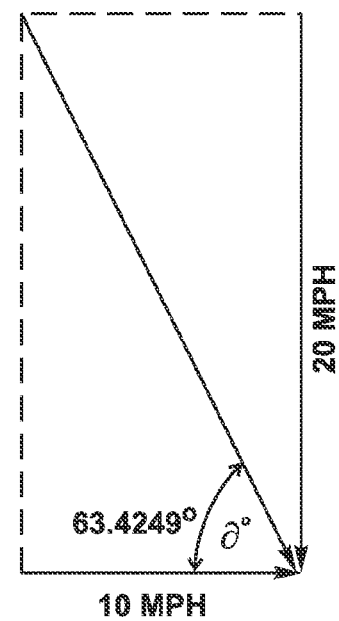

Fig. 23

WIND TURBINE

CROSS REFERENCE TO RELATED APPLICATIONS

This is a continuation of U.S. patent application Ser. No. 13/221,656 filed Aug. 30, 2011, which is a continuation-in-part of PCT Application PCT/US2010/039487 filed Jun. 22, 2010, which in turn claims priority from U.S. Provisional Application 61/269,183, filed Jun. 22, 2009 and which U.S. patent application Ser. No. 13/221,656 further claims priority from U.S. Provisional Application 61/402,451 filed Aug. 30, 2010. Priority is claimed from all of the above applications, all of which are incorporated herein by reference.

BACKGROUND OF THE INVENTION

The invention broadly relates to wind turbines, more specifically to a wind turbine designed to extract energy from the wind.

Mankind has been using various types of rotary devices to extract energy from the wind for centuries. The types of mechanisms used include a multiple blade arrangement that rotates around a central axis. The apparatus may be configured with either a vertical axis or a horizontal axis. The horizontal axis type includes both windmills and wind turbines. The vertical axis devices generally provide methods that have more resistance to the wind on one side of the axis and less resistance on the other half such that the difference in wind resistance allows the unit to turn, and as a result, they exhibit significant inefficiencies. Horizontal axis windmills are usually open blade mechanisms such as for example, the old four blade Dutch windmills, Or the modern windmill with three blades, which has been proliferating around the world. The Dutch windmills are, effectively, a reaction type apparatus that relies on the impact of the wind on the angled blade to cause a force to turn the rotor. They are quite inefficient but if made large enough, they can supply some useful work.

Another type of wind device is the multi blade unit used to provide farmers with a means to pump water. This device might have 20, 30, or more blades and develop enough torque to turn a pump. This configuration is, also, a reaction type windmill driven, primarily, by the impact of the wind on an angled blade. This type is very inefficient over a broad wind spectrum and they are noisy and fragile and need to be shut down during periods of sustained high winds The use of three-blade windmills has become very prominent around the world, Multiple three-blade windmills are usually arranged to establish "Wind Farms". A large wind farm may consist of a few dozen to several hundred individual three-blade windmills, and may cover an extended area of hundreds of square miles. The windmills used for wind farms are of enormous size with a blade swing diameter that ranges around 300 foot. They often rise to heights of 300 feet to 400 feet and require large amounts of land. They utilize the force from Bernoulli's Theorem as it is used to create the lift force on an airplane wing. However, the blades of three-blade turbines occupy only 5% of the blade swing area. Hence, 95% of the kinetic energy in the air mass passes between the blades and is lost. Adding more blades is not the answer as just one more blade causes the efficiency to become even worse. This is because of the enormous turbulence surrounding each blade thus causing interference with the other blades.

The three-blade windmills convert less than 1.4% of the kinetic energy in the wind to useful electrical energy; Yet, three-blade windmills are considered the most economically viable method currently available for generating significant electrical power from the wind. Because three-blade windmills are extremely expensive while being very inefficient, it is mathematically impossible for them to have a reasonable return on investment or a competitive cost for a kilowatt hour of electrical power without government subsidies, grants, and tax abatements. Further, their huge size dominates the skyline so that they are intrusive and can be annoying with flickering shadows, TV interference, and sometimes humming noises. Their very complex design involves thousands of parts, and, usually, adjustable pitch blades driven by expensive servo-mechanisms.

U.S. Pat. No. 4,021,135 (Pedersen), and U.S. Pat. No. 4,140,433 (Eckel) disclose a device attempting to enhance the Bernoulli effect as used by three-blade windmills by using fixed shrouds around the outside of the blades to funnel more air around the blades. This approach encourages some of the air mass to diverge around the windmill because it perceives a funnel as an obstacle thereby causing a net loss of available kinetic energy. These devices have rotatable blades that are in close proximity to a non rotating shroud, and as a result will experience serious drag and turbulence and thus a loss in efficiency.

Alternate configurations that attempt to provide higher efficiency are disclosed in U.S. Pat. No. 4,611,125 (Stone Jr.), which teaches a concept, which improves airflow, however, still allows a large percentage of the kinetic energy in the wind to bypass the structure unused. In U.S. Pat. No. 7,396,207 (DeLong), the use of sails to augment the amount of wind energy captured is commendable excepting for the practical problems associated with the complexities of continuous adjustment of the sails, handling of storms, and contending with ice and snow. In U.S. Pat. No. 4,150,301 (Bergey), the object has been to provide rotation speed regulation at considerable expense to efficiency. There is little evidence that demonstrates that any of these methods improve efficiency, simplicity, or cost.

U.S. Pat. No. 7,214,029 (Richter) discloses a device that initiates the acceleration of the air mass and implies that the kinetic energy is increased by diverting the air mass around a frontal structure to cause it to concentrate and speed up as it enters a funnel shape and then onto the many multiple blades. This, of course does not increase the kinetic energy in the air mass as per the laws of conservation of energy. Also, this system relics on the reaction force of the wind air mass impacting the angled blades. This is an inefficient method of extracting energy from the wind. Further, the wind will view any structure placed in an open-air environment as an obstacle and divert a substantial percent of that air mass around the obstacle. This is substantially different from such designs being placed in a long tube with forced air being driven through.

United States Patent Application No. 2008/0232957 (Presz), discloses a fixed shroud that surrounds a set of stator blades that direct airflow around a three bladed impeller rotor with mixer air diffused into the after area of the impellers. It is implied that this will increase the energy output of the impeller system by two to three times. However, despite the unsupported allegation, no hard evidence is provided for any such result. It is also implied that the configuration permits the airflow velocity to increase by use of the diffuser system located after the impeller rotor. This supposed increase in velocity, however, becomes a problem for three blade impellers, operating by use of Bernoulli's Theorem, since they cannot tolerate higher air velocity speeds without self destruction. They are also limited by the requirement that the blade tip velocity be seven times the wind speed in order to achieve reasonable efficiency. Further, pitch control of the blades and stator is essential to maximize performance in variable winds. All of this leads to an extremely complicated and costly device for which no actual improvement is shown. The huge shroud portrayed would add substantial weight and structural requirements to this wind turbine and the device would need to have tremendous strength to withstand even ordinary winds. The rotation of the impeller blades within the fixed shroud would generate significant drag and turbulence between the blade tips and shroud due to air mass being flung outward due to centrifugal and other forces caused by rotation of the impeller rotor and the extraction of energy. It is truly questionable whether any improvements resulting from the device could offset the increased costs and the environmental intrusion of such a structure.

U.S. Pat. No. 4,140,433 (Eckel) discloses a system that provides complex multistage turbines to cause each stage to enhance the wind power. The wind; however, sees this whole turbine as an obstacle to get through. Hence, some of the air stream, and energy, approaching the rotor will divert around the turbine. This theory works for power turbines where hot gasses are forced through as in aircraft jet engines. This approach is highly complex and very expensive without gaining credible efficiency because the many blades also cause drag and turbulence. It should also be noted, that the increased cost and complexity hardly justifies multiple stages, since each subsequent stage must extract energy from air from which energy has already been extracted.

Vertical axis windmills, which rely on providing greater force on one side of the axis than on the other. Examples of vertical axis windmills are shown in U.S. Pat. No. 5,525,037 (Cummings) and U.S. Pat. No. 4,619,585 (Storm). These windmills are notoriously inefficient since there is always drag on the side returning against the wind, which subtracts from the power generating side. Another approach is shown by U.S. Pat. No. 7,362,004 (Becker) utilizing a complex structure to control rotation speed at the expense of drag, turbulence, poor airflow, and many obstructions all of which reduce efficiency. U.S. Pat. No. 7,116,006 (McCoin) provides an ingenious arrangement to convert horizontal airflow to vertically mounted, counter rotating blades, which balance torque on the tower and maximize rotor speed. This is accomplished at great cost to efficiency in part due to the reaction blade system used. These types of mechanisms, generally, create significant turbulence, drag, and interference with the air stream. The many efforts for improvement by adjusting the differential forces on each side of the axis can only be slightly effective since there are so many other factors that can spoil the efficiency. The many patents involving windmills and wind turbines represent attempts at improving ways of better utilizing Bernoulli's theorem, or ways of better using reaction or impact methods as an air mass strikes a surface. Only minor gains are achieved as the basic theorems are highly limited as to the theoretical maximum efficiencies achievable. Further, the many efforts to gain greater efficiency and solve vexing problems, as presented in so many patents, involve astonishingly complex mechanisms which can be troublesome in the harsh environment of windmills. This raises serious questions of long-term cost and maintenance. The calculation of efficiency for a windmill or a wind turbine can be demonstrated by starting with a theoretical maximum output of "100" and then applying the known losses as follows:

Three-blade windmills using the Bernoulli Theorem:

$$\text{Efficiency} = 100 \times 5\% \times 95\% \times 45\% \times 65.5\% = 1.4\%$$

5% is the area of the blades in contact with the wind.

95% is the wind utilized and not bypassed around the blades.

45% is the conversion of kinetic energy to rotor horsepower output.

65.5% remainder after gearbox (10% loss and losses of generator/inverter).

Thus, there is a long felt need for a properly designed wind turbine that can deliver 35% and as much as 55% of the wind kinetic energy into useful electrical power, which is about 25 to almost 40 times greater than the typical three-blade windmill efficiency of only 1.4%.

There is a further long felt need for a wind turbine that can start generating power at lower wind speeds and continue producing power even during high speed wind storms. Currently, at low wind speeds and during storms, loss of wind power by a three-blade windmill can be estimated at as much as 50%.

There is a further long felt need for a wind turbine designed much smaller than a three-blade windmill for the same annual megawatt hour output.

BRIEF SUMMARY OF THE INVENTION

The wind turbine in accordance with the invention causes a moving mass of air, as wind, to be driven out of its path of motion to create the force that drives the turbine smoothly and efficiently with little turbulence by use of Newton's First Law of Linear Motion. The wind turbine of the invention may be a wind turbine having a rotatable hub with an enclosure surrounding the tips of the blades, and being connected to them, which blades cause a moving mass of air, as wind, to be driven out of its path of motion to create the force that drives the turbine smoothly and efficiently with little turbulence.

More particularly, the invention is a wind turbine having a set of curved blades mounted on a central rotatable hub. Each of the blades has a length from the hub to a tip and a wind contact surface defined by a leading edge and a trailing edge and a defined pitch angle, to a rotational axis of the hub along the blade from the hub to the tip. A curve is provided on the wind contact surface along each of the blades over the blade surface from the leading edge of the blade to the trailing edge of the blade by an amount between about 6 and about 18 degrees;

The defined pitch angle from any point along said the leading edge of each of the blades is defined by the arc-sine of a ratio of blade velocity to apparent wind velocity, with a variance of ±30 percent of the complementary angle to the arc-sine.

Apparatus for varying the velocity of the blade is to control power output so that it is within fifteen percent of maximum obtainable power.

The pitch angle is at least 20 degrees and not greater than 85 degrees, and the pitch angle closest to the hub is at least fifteen degrees less than the pitch angle of most distant from the hub.

Preferably, the apparatus for varying the velocity of the blade varies the velocity such that velocity and drive force are each within at least 40 percent of maximum. A cone is desirable provided as part of the hub to direct wind around the hub to the blades.

It is to be understood that "hub" means a central part to which blades are attached and also is intended to include portions of the blade proximate the hub which do not have a pitch angle as described herein.

BRIEF DESCRIPTION OF THE DRAWINGS

The nature and mode of operation of the present invention will now be more fully described in the following detailed description a preferred embodiment of the invention taken with the accompanying drawing figures, in which:

FIG. 1 is a front view of a preferred embodiment of a turbine of the present invention;

FIG. 2 is a top view of the preferred embodiment of the turbine shown in FIG. 1;

FIGS. 11a through 11d are top views illustrating the wind flow without blade displacement of the wind;

FIGS. 12a through 12d are top views illustrating the wind flow with blade displacement of the wind;

FIG. 15 is a side view of a preferred embodiment of a forward partition and lock down system of the present invention;

FIG. 16 is a front view of a preferred embodiment of a forward partition and a main bearing of the present invention;

FIG. 17 is a side view of a preferred embodiment of a rear partition and a main bearing of the present invention;

FIG. 18 is a front view of a preferred embodiment of a rear partition and a main bearing of the present invention;

FIG. 19 illustrates vectors of true wind, blade speed and apparent wind;

FIG. 23 shows a graph of true wind velocity against blade velocity permitting calculation of input angle of the blade.

DETAILED DESCRIPTION OF THE INVENTION

Figure 3:
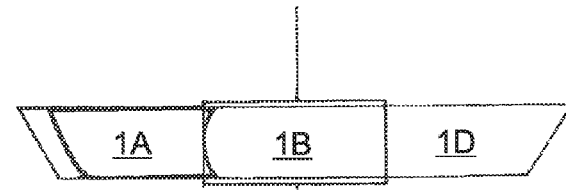
FIG. 3 is a top cross-sectional view of a turbine blade used in the turbine of the preferred embodiment of the present invention taken on line 3-3 of FIG. 5.

The invention is a wind turbine as previously described. It is to be understood that the pitch angle on the blades need not necessarily extend along the entire leading edge of the blades. In such a case the wind turbine may be more particularly described as follows:

A wind turbine for operation within a circular area including:

A set of curved blades mounted on a central rotatable hub. Each of the blades has a length from the hub to the tip and a wind contact surface defined by a leading edge and a trailing edge and a defined pitch angle, to a rotational axis of the hub, along at least a portion of the blade from the hub to the tip such that the at least a portion of the blades passes through at least 85 percent of said circular area.

A curve is provided on the wind contact surface along the at least a portion each of the blades having an increasing pitch angle of the blade, over the blade surface from the leading edge of the blade to the trailing edge of the blade by an amount between about 6 and about 18 degrees.

The defined pitch angle from any point along the leading edge of the at least a portion of each of the blades being defined by the arc-sine of a ratio of blade velocity to apparent wind velocity, with a variance of ±30 percent of the complementary angle to the arc-sine; and apparatus is proved for varying the velocity of the blade to control power output so that it is within fifteen percent of maximum obtainable power.

The pitch angle is at least 20 degrees and not greater than 85 degrees, and the pitch angle closest to the hub, of the at least a portion of the blade, is at least fifteen degrees less than the pitch angle of the at least a portion of the blade most distant from the hub.

In one embodiment, the present invention is a wind turbine having a set of curved blades mounted on a central rotatable hub. An enclosure surrounds and is attached to the tips of the blades. The enclosure is arranged to rotate with the hub and the blades. The blades have a fixed pitch such that a pitch angle φ of each of the blades at the tip end of the leading edge is from 50 degrees to 80 degrees to a rotational (central) axis of the hub. A preferred leading edge pitch angle α of each of the blades at a hub end is defined by the formula: α=(Arctan of (Tan φ×hub diameter))/turbine tip diameter. The leading edge pitch angle of the blade at the hub is usually from about 28 to 49 degrees to the rotational axis but may vary considerably depending upon the diameter of the hub. In general, the leading edge pitch angle at the hub increases with increasing hub diameter. The preferred leading edge pitch angle ɘ is the same as the apparent wind angle. The apparent wind angle at any location along the length of the blade can be clearly derived from FIG. 19 and from FIG. 19 the apparent wind angle may clearly be determined by the formula ɘ =arctan (blade velocity/true wind velocity) where blade and wind velocities are in the same linear units per unit time (or multiplied by a conversion factor to make it so), e.g. feet per second, miles per hour, meters per second, etc. Since the apparent wind angle is a function of blade speed, as shown in FIG. 19, the apparent wind angle may be controlled by controlling blade speed thus making it possible to utilize fixed pitch blades, i.e. blades that that have a fixed pitch that varies over their length and width but do not change pitch during operation.

The blade is provided with a surface that curves into the path of the apparent wind. (the angle of the wind seen by the moving blade) impinging upon the blade at a wind entry location of the blade. This curve may be referred to as the "maintenance curve". The maintenance curve maintains surface contact with the apparent wind to deviate the apparent wind from its path thus extracting energy from the apparent wind. The maintenance curve effectively gradually increases the pitch angle of the blade as the wind flows along the blade surface. The maintenance curve of the surface preferable increase the pitch angle of the blade, over the blade surface from the leading edge of the blade to the trailing edge of the blade, usually by an amount between 6 and 18 degrees. It is believed that a preferred pitch increase is about 12 degrees.

The turbine is further provided with an apparatus that controls speed of rotation of the turbine so that the angle of the apparent wind to the blades can be adjusted relative to the pitch angle of the blades to obtain at least 50% of maximum energy that can be extracted using the turbine where angle of apparent wind preferably matches the angle of blade at location of contact with the blade. In all cases the angle of apparent wind approximates the pitch angle of the blade at contact. "Approximates" as used in this context means a variance of 3 degrees or less. As is apparent from FIG. 6, it should be understood that the blade angle at the leading edge should usually not be less than the angle of apparent wind since apparent wind would then strike the back of the blade.

Stated in another way, the pitch angle of the blades is an angle that approximates a constant apparent wind angle and the apparent wind angle is kept constant by controlling the rotational speed of the blades relative to incoming wind speed and the angle of the blade is between 30 and 80 degrees to the rotational axis In some embodiments, the enclosure includes a circumferential sidewall about a central axis, the circumferential sidewall includes a front opening being adapted to face true wind and a rear opening. The sidewall slopes from the front opening to the rear opening such that the rear opening has a larger diameter than the front opening. The sidewall slopes from the front opening to the rear opening at an angle to a plane of the front opening between 100 degrees to 135 degrees and preferably from 107 degrees to 112 degrees.

In some embodiments, each of the blades includes a leading edge and a trailing edge having a surface for receiving wind, wherein the number of blades is sufficient to entirely redirect direct wind impinging upon the turbine. For example, the leading edge of each of the blades may overlap the trailing edge of an adjacent blade by an amount between 14% and 20% of its surface area, but in some circumstances overlap may be as much as 60%.

In some embodiments, each of the blades are twisted such that the tip end of the blade is twisted at an angle to the central axis of an amount between 54 degrees to 64 degrees. Each of the blades, in some embodiments is twisted such that the hub end of the blade is twisted at an angle to the central axis of an amount between 28 degrees to 49 degrees.

In some embodiments, the turbine includes a nose cone at the front of the turbine face covering the hub, and which is streamlined to transfer an air mass approaching the turbine to be directed around the hub and into the blades so that kinetic energy in the air mass is captured.

In some embodiments, the turbine is connected to a multi-pole generator having poles connected in series and of sufficient size to provide a higher output voltage relative to the output of a dipole generator. In some embodiments, an inverter is connected to the generator output with means to provide the maximum electrical output of the generator under all normal wind conditions for delivery to the user.

In some embodiments, the control of turbine speed is regulated by a controller that measures generator power output and modifies field current of the generator to load its rotor to regulate rotation speed of the turbine to obtain at least 50% and, preferably at least 80%, of maximum generator power output under all wind conditions.

In some embodiments, the set of fixed pitch blades are shaped with a curvature on a first side and a different curvature on a reverse side to affect the apparent wind as seen by the moving blades of the turbine.

It is an object of the present invention to provide a wind turbine that is ½ to ⅕th the diameter of a three-blade windmill having the same annual megawatt hour output.

It is a further object of the present invention to provide a wind turbine where up to 95% of the wind is utilized and not bypassed around the turbine and at least 35 percent and as much as 50 percent or more is used for the conversion of kinetic energy to rotor horsepower output. After electro-mechanical losses at least 70 percent of the rotor horsepower output can be converted to useful work, e.g., in the form of useful electrical power. The wind turbine of the invention using Newton's First Law of Linear Motion may thus converts as much as 35 percent or more of wind kinetic energy to useful electrical power:

$$100\times 95\%\times 51\%\times 72.5\%=35.1\%$$

95% is the wind utilized and not bypassed around the turbine.
51% is the conversion of kinetic energy to rotor horsepower output.
72.5% remainder after electro-mechanical losses of generator/inverter. No gearbox.

These and other objects and advantages of the present invention will be readily appreciated from the following description of preferred embodiments of the invention and from the accompanying drawings and claims.

Unless defined otherwise, all technical and scientific terms used herein have the same meaning as commonly understood to one of ordinary skill in the an to which this invention belongs. It should be appreciated that the term "true wind" is defined as the actual speed in the direction of the wind as it approaches the turbine. The direction of true wind is usually along the same axis as the rotation axis of a horizontal windmill or turbine. The term "apparent wind" as used herein means the speed and relative direction from which the wind appears to blow with reference to a moving blade. The "angle of the apparent wind" is the angle between the direction of the apparent wind relative to true wind. It should be appreciated that the term "wind turbine" is defined as an apparatus having an internal rotor having angular blades, surrounded by a circumferential wall, that generates rotary mechanical power from the energy in a stream of fluid. The "front blade surface" is a surface of the blade receiving true wind. The "reverse blade surface" is a surface of the blade shielded from true wind. The central axis is also equivalent to the rotational axis and can be used interchangeably. The "leading edge" is the edge of the blade that strikes air as a result of blade rotation and is the edge of the blade surface furthermost on the blade in the direction of rotation. The "trailing edge" is the edge of the blade opposite the leading edge and follows the leading edge in the direction of rotation.

At the outset, it should be appreciated that like drawing numbers on different drawing views identify identical, or functionally similar, structural elements of the invention. While the present invention is described with respect to what is presently considered the preferred embodiments, it is to be understood that the invention as claimed is not limited to the disclosed embodiments.

Furthermore, it is understood that this invention is not limited to the particular methodology, materials and modifications described and, as such, may, of course, vary. It is also understood that the terminology used herein is for the purpose of describing particular embodiments only, and is not intended to limit the scope of the present invention, which is limited only by the appended claims.

Referring now to the figures, FIGS. 1 thru 2 illustrates a preferred embodiment of a turbine assembly 1 having plurality of fixed pitch blades 1A mounted on hub 1B with axle 1C and attached within enclosure 1D as a single stage turbine and as a single rotating part. It should be understood that hub 1B which maybe an axle or may form a part of an axle. Axle 1C is projected forward and is enclosed within nose cone 1E which also rotates with the turbine. Specifically, the turbine has eight fixed pitched blades. Each blade 1A includes tip end 20 and hub end 21. Each tip end 20 is equally spaced at angle (θ) of about 45° to central axis a-a'. Blade 1A further comprises leading edge 22 and trailing edge 23 defining front surface 28 for receiving wind, wherein the number of blades is sufficient to entirely redirect direct wind impinging upon the turbine. Leading edge 22 of each blade 1A overlaps trailing edge 23 of an adjacent blade defining overlap surface 29. Preferably, leading edge 22 of each blade 1A overlaps trailing edge 23 of an adjacent blade by an amount between 5% and 60% and more preferably from 14% and 20% of its surface area. Each blade 1A having a fixed pitch such that pitch angle (Θ) of the blade at the tip end is from a range between 54 degrees to 75 degrees to rotational (central) axis a-a'.

In the present embodiment, enclosure 1D surrounds tip end 20 of the blades and is attached thereto. Enclosure 1D is arranged to rotate with hub 1B and blades 1A about central axis a-a'. Enclosure 1D includes circumferential sidewall 25 defining front opening 26 and rear opening 27. Front opening 26 is adapted to face true wind 31. Circumferential sidewall 25 is arranged about central axis a-a'. In should be understood that for the purpose of illustration true wind 31 is a direction along central axis a-a'. Sidewall 25 slopes from front opening 26 to rear opening 27 such that the rear opening has a larger diameter than the front opening. Preferably, sidewall 25 slopes from front opening 26 to rear opening 27 at angle (Ψ) to a plane of the front opening between 100 degrees to 135 degrees, preferably from 107 degrees to 112 degrees. FIGS. 1 and 2 further illustrate top and front views of turbine assembly 1. It should be appreciated that preferably, the turbine, itself, could be one solid casting. However, the individual parts of the turbine can be made separately and assembled to become one part with final assembly in the field. The components may be fabricated out of any substantially rigid material such as, for example metal or a reinforced plastic. Preferably, all of the components should be the same color. Nose cone 1E is shaped to deflect air mass at the hub diameter into blades 1A so that little of the kinetic energy is lost. The shape and curvature of the nose cone are determined for maximum efficiency. The axis supports the nose cone, which has a cast in receptacle to fit the axis. The aft end of nose cone 1F is bolted and sealed to hub 113. The output signal of the wind direction servo 1F is telemetered through the axis to orient the turbine into the wind by use of the gear motor shown in FIG. 14. In a preferred embodiment, the nose cone is cast up in a mold using reinforced plastic.

Figure 4:
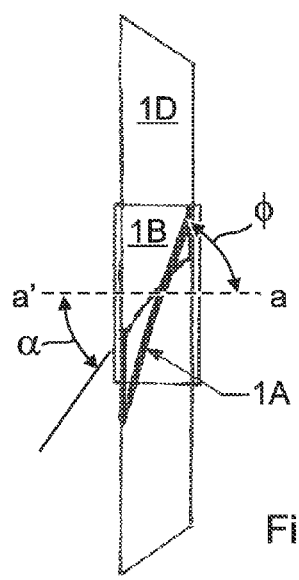
FIG. 4 is a side cross-sectional view of a turbine blade used in the turbine of the preferred embodiment of the present invention taken on line 4-4 of FIG. 5.
Figure 5:
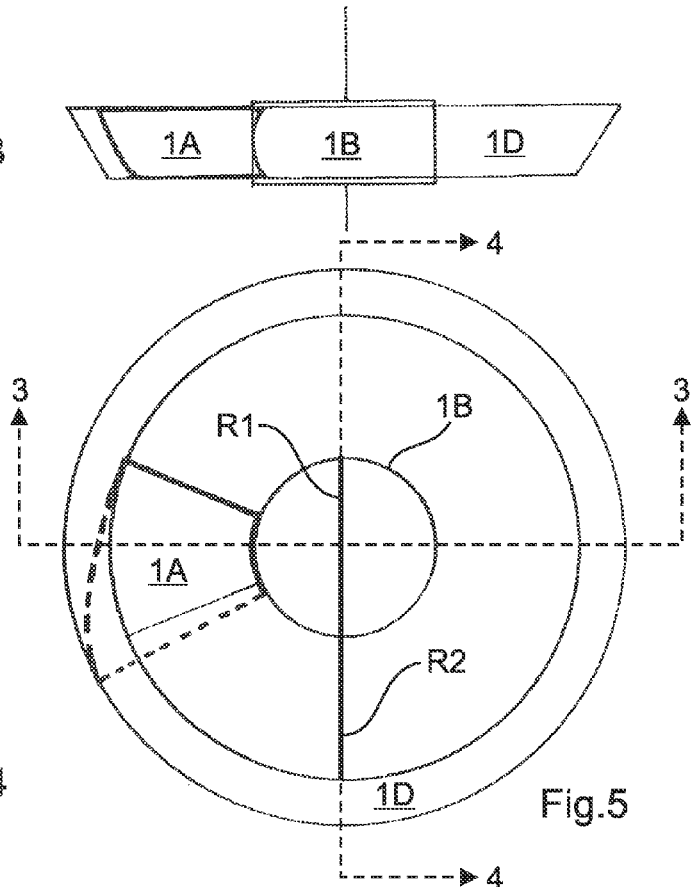
FIG. 5 is a front view of the turbine of a preferred embodiment of the present invention.

FIGS. 3 through 5 illustrate a plurality of turbine blades 1A. Preferably, each of the blades is configured to include a precise compound curve. The primary curve determines the amount of displacement of the air mass as it passes through the turbine and is about eleven to twelve degrees with an eight-blade configuration, but may vary somewhat as related to the number and shape of the blades, the size of the turbine, and its determined rotation speed. The secondary curve is a twist from the blade tip to the blade base to accommodate the change in the blade circumference and its relative travel speed. Preferably, tip end 20 of blade 1A is twisted at pitch angle (Θ) to the rotational (central) axis a-a' of an amount between 54 degrees to 75 degrees. Even more preferably from 58 degrees to 64 degrees. Specifically, the blade angle at the tip end may be twisted to 60 degrees. The blades are twisted such that hub end 21 of blade 1A is twisted at angle (α) to rotational (central) axis a-a' of an amount between 28 degrees to 49 degrees. Specifically, the blade angle at the hub end may be 34 degrees. Even more specifically, the pitch of each of the blades at hub end 21 is defined by a product of a ratio, of hub radius R1 divided by turbine radius R2, multiplied by a pitch angle at the tip. The pitch can vary, somewhat, in accordance with the relative hub diameter, the desired turbine rotation speed, and the established power curve for a specific turbine. It should be understood that many modifications of the blade configuration may be made without departing from the scope of the appended claims. For example, increasing or decreasing the number of blades and increasing or decreasing the overlap of the blades is well within the concept of the invention. Likewise, it is to be expected a somewhat different curvature of the blades may be determined that will further enhance efficiency.

Figure 6:
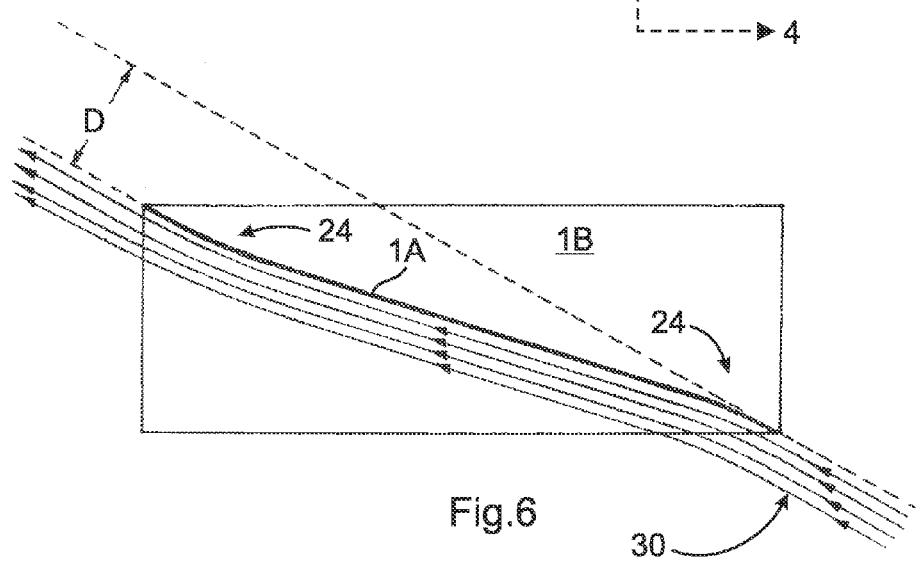
FIG. 6 is a view of airflow relative to a turbine blade.

FIG. 6 is a top view of turbine blade 1A as the airflow of apparent wind 30 moves along the blade as the blade rotates. Turbine blade 1A includes compound curve 24. As seen in FIG. 6, the angle of the apparent wind is approximately the same as the angle of the blade at the location of input of apparent wind.

Figure 7:
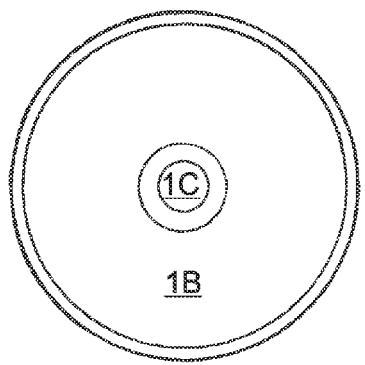
FIG. 7 is a front view illustrating a hub of a preferred embodiment of the present invention.
Figure 8:
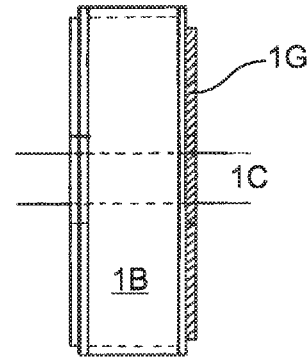
FIG. 8 is a side view illustrating a hub of a preferred embodiment of the present invention.

FIG. 7 is a front view illustrating the hub of the present invention and FIG. 8 is a side view illustrating the hub of the present invention. Turbine hub 1B is secured to axle 1C with the blades are mounted on hub 1B outer periphery in a manner that provides structural integrity. Preferably, the base of the blades is secured from inside of the hub. Preferably, the turbine hub is to be essentially an aluminum pipe with end caps on the front and back to support axle 1C. The back of the hub supports disc brake surface 1C that is used to lock down the turbine. Axle 1C is an aluminum pipe, which extends from the forward inside part of nose cone 1E to the back end of generator armature 5B. The wall thickness, diameter, and temper, are determined in accordance with good engineering practice for the loads and stresses expected with hurricane force winds for a specific turbine size.

Figure 9:
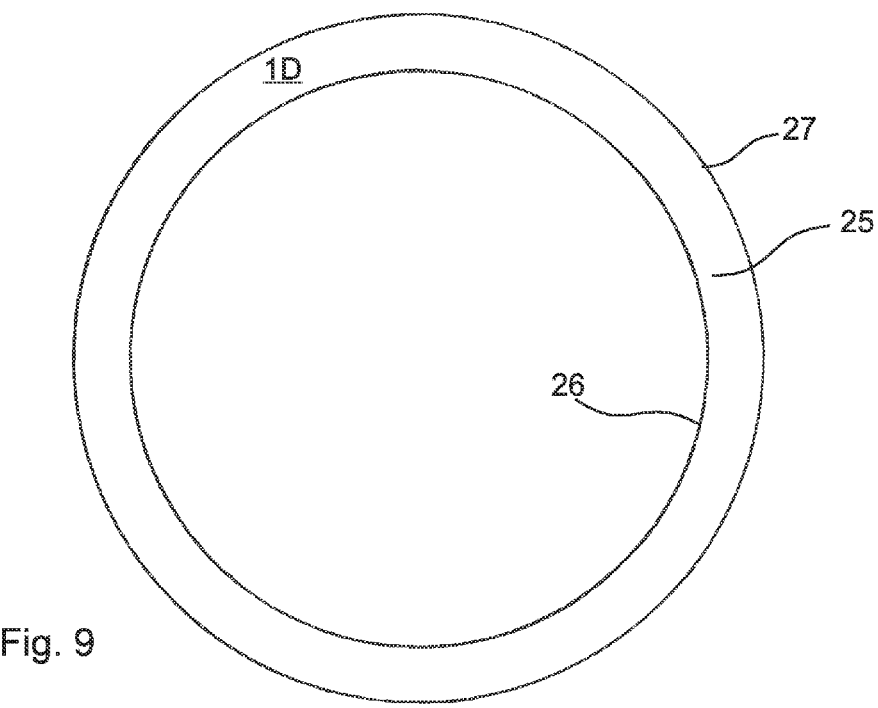
FIG. 9 is a front view illustrating a structural flared enclosure of a preferred embodiment of the present invention.
Figure 10:
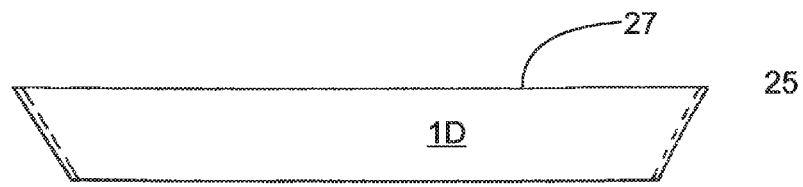
FIG. 10 is a top view illustrating the structural flared enclosure of a preferred embodiment of the present invention.

FIGS. 9 and 10 illustrate the structural flared enclosure 1D having sidewall 25 sloping from front opening 26 to rear opening 27 such that the rear opening has a larger diameter than the front opening. Enclosure 1D is supported by a plurality of blades that are secured to the enclosure in a structurally integrated manner. Preferably, the blades are secured to the enclosure by drilling a bolt through the enclosure and down into the blade. Enclosure 1D provides high strength and ruggedness to the turbine assembly since both ends of the blades are fully supported. Enclosure 1D flans outward from the front opening toward the back opening. The angle of flair is mathematically determined to expand the volume of the turbine from front to back by an amount proportional to the percent of energy extracted from the wind. For example, if 50% of the energy were extracted, the volume of the space within the turbine would need to increase by about 30% to prevent the air mass from slowing down. It is envisioned that the structural flared enclosure be made with a reinforced plastic to match the blades.

For purpose of illustration FIGS. 11 and 12 show successive "snap shot" paths of true wind 31 as it impinges on the face of the turbine blade 1A. FIGS. 11a through 11d are top views illustrating the wind flow without blade displacement of the wind. The figures show how air mass 32 passes straight through the turbine without touching blade 1A if there is no blade curvature and blade 1A are moving to match apparent wind 30. The blades, effectively, move out of the way just in time. FIGS. 12a through 12d are top views illustrating the wind flow with blade displacement of the wind. True wind 31 is forced out of its path of motion by a curved blade with the same conditions as in FIG. 11. As can be seen in FIG. 12a, the speed of the turbine blade is set so that the angle of apparent wind 30 initially approximately matches the angle of the pitch of blade 1A.

Figure 13:
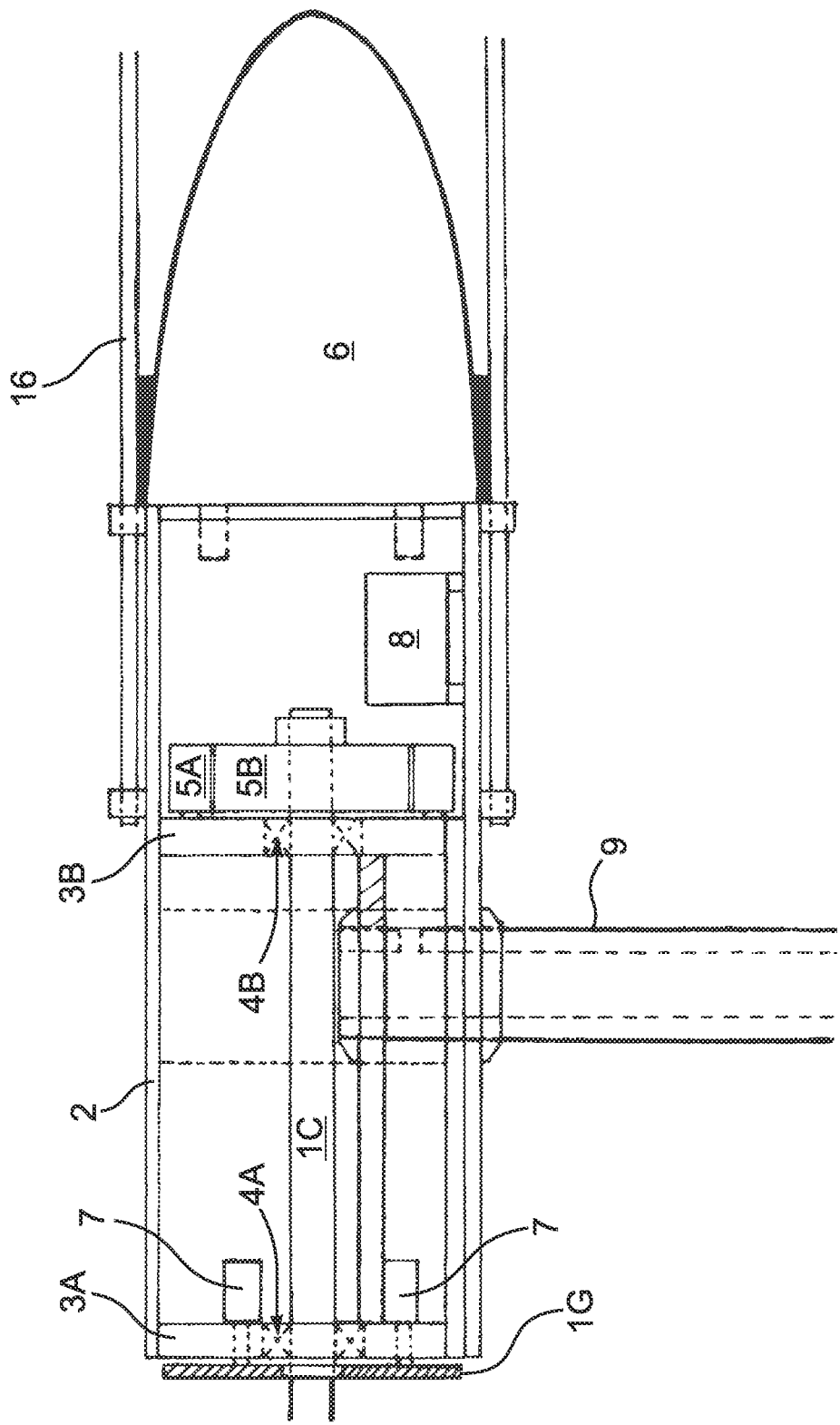
FIG. 13 is a side cross-sectional view of a main housing assembly of the present invention.

FIG. 13 is a side cross-sectional view of the main housing assembly of the present invention. The rear portion of axle 1C is supported within housing 2 which contains two partitions 3A and 3B at front and partly back, each containing main axle bearings 4A and 4B. The aft end of axle 1C is attached to generator armature 5B which rotates within generator stator 5A. The generator is mounted in the rear portion of housing 2 on rear partition 3B. Partitions 3A and 3B each have forward main bearing 4A and rear main bearing 4B secured, concentrically, in the middle of the partition for axle 1C. These are permanent life time lubricated and sealed roller bearings designed to outlast the turbine life of at least 40 years because of the low speeds and light loads. These partitions are structurally secured within main housing 2. Forward partition 3A provides lock down system 7 using hydraulic cylinders and a disc brake surface 1G. Rear partition 39 has generator stator 5A mounted directly upon the partition concentric with the axis and generator armature. Preferably, the partition may be made from a variety of non-magnetic material. Preferably, the partition is made out of aluminum. The generator comprises armature 5B mounted concentrically within stator 5A. The diameter of the stator is as large as is feasible within the space available on rear partition 3B. The objective is to provide as high a peripheral speed as possible to cut the lines of magnetic force faster for higher voltages. The generator also has multiple poles, which are connected in series to increase the voltage at low wind speeds. The power controller/inverter 8 is shown in the control space behind the generator. Space is provided for a solid-state controller/inverter 8, which regulates the turbine rotor output to the electrical load. The back end of the pipe housing is enclosed by cone shaped door 6, which provides access to the control space by moving on slider/struts 12A. The control of turbine speed is regulated by controller 8 that measures generator power output and modifies field current of the generator to load rotor to regulate rotation speed of the turbine to obtain at least 50% and preferably at 1.5 least 80% of maximum generated power output under all wind conditions, In the present embodiment, the assembly is mounted on a column 9 structurally secured within main housing 2 and which extends down into main support column 10 and enabled to rotate into the wind by use of a set of axial and thrust bearings 11. Rear mounted wind vane 12 provides orientation into the wind, during storm power shortages, but it is also assisted by gear drive motor 13, and wind direction servo 1F, during normal conditions. The turbine can be locked down by use of lock down mechanism 7 and disc brake surface 1G.

Figure 14:
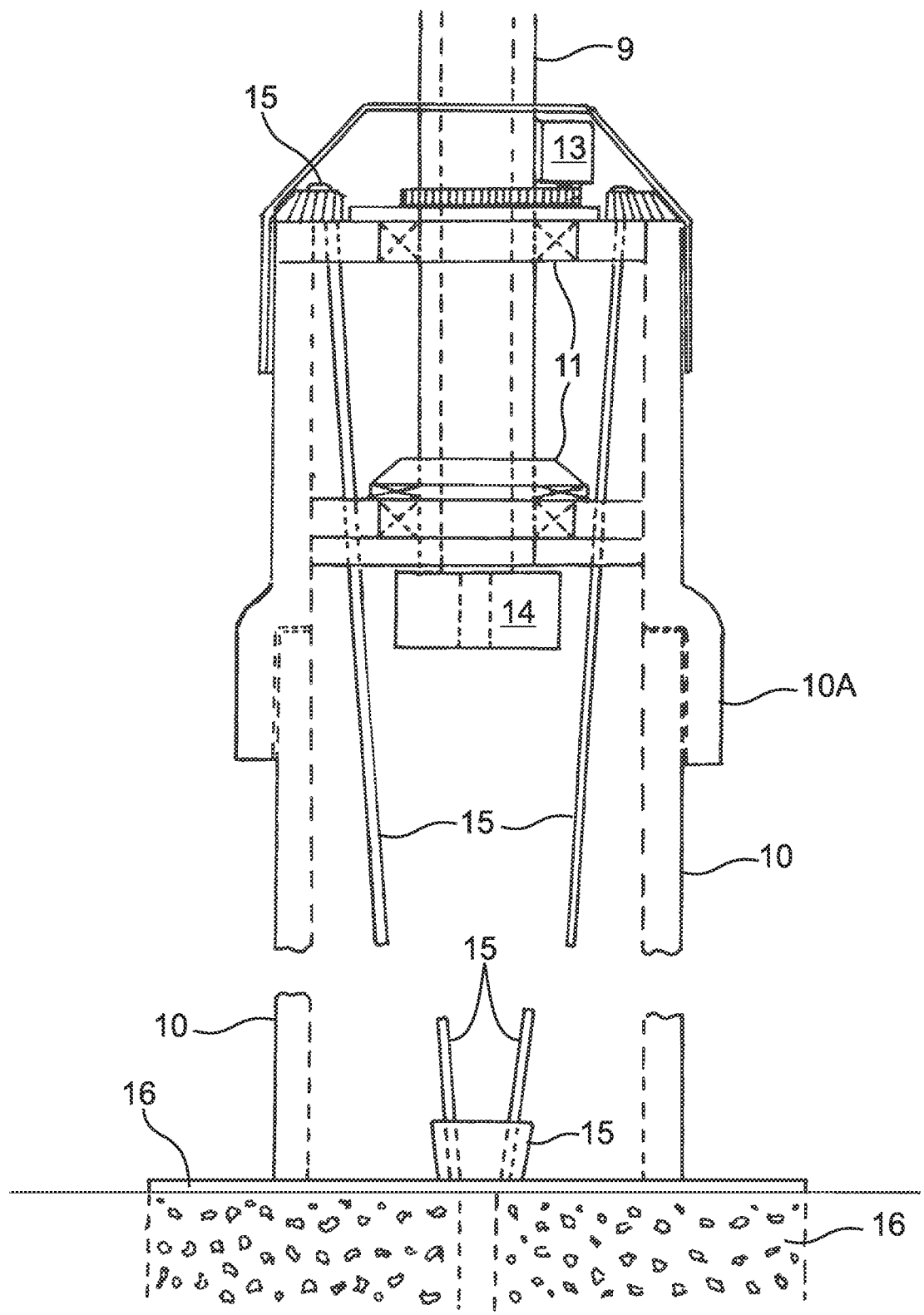
FIG. 14 is a side cross-sectional view of a main column and cap assembly of a preferred embodiment of the present invention.

FIG. 14 is a side cross-sectional view of the main column and cap assembly of the present invention. Upper column 9 is attached to main housing 2 and rotates with it. It is of slender design to minimize interference of the air stream leaving the turbine. It is a hollow aluminum pipe, which carries the power and control cables out of the generator and control system to slip ring assembly 14, which allows the turbine to rotate freely without winding up the cables. Main support column 10 is mounted on a substantial concrete base that extends deep into the ground. A compression ring and tie down rod system 15 at the top of the column in the main column cap 10A, extend down to the concrete base to a center connector to hold the entire column in compression. This provides powerful "tip over" resistance. The main support column can be constructed of reinforced concrete pipe of an appropriate diameter. A set of axial and thrust bearings 11 is located within main column cap NA at the top of main support column 10 just under tie down rod system 15 and supported by the top and sides of the main support column. This provides the means by which upper column 9 can turn freely so the turbine can face into the wind. Gear drive motor 13 is secured to upper column 9 and connected to main column 10 by a heavy-duty drive chain by which it can turn the entire wind turbine to face into the wind. A built in slip clutch prevents damage from strong wind gusts.

In the present embodiment, power output cables from the generator/inverter control space are connected to slip ring assembly 14 within cap 10A of main support column 10 so the assembly can rotate freely without winding up the cables. The main control column is mounted on secure foundation 16 and held under compression by three tie down rods 15. The wind turbine provides extraordinary efficiency with unusual simplicity utilizing a concept of physics known as "Newton's First Law of Linear Motion". This provides highly efficient energy extraction from the wind.

FIGS. 15, 16, 17, and 18 illustrate two partitions 3A and 3B each have forward main bearing 4A and rear main bearing 4B secured, concentrically, in the middle of the partition for axle 1C. These partitions are structurally secured within main housing 2. The disc brake surface 1G of lock down mechanism 7 is mounted between the back of hub 1B and the front of main housing 2 and operated with 3 pistons that are hydraulically operated to engage the discs to prevent rotation. This is a manual system that can be operated from within the control space or from the ground.

FIG. 19 illustrates vectors of true wind 31, blade speed 36 and apparent wind 30. This vector diagram shows the relationship between the true wind speed and the rotor speed at blade tip 35 and blade base 34. This defines the apparent wind angle and velocity as the hypotenuse of the triangle with one leg being the true wind speed and the other blade speed 36. This mathematically defines the desired pitch angle of the turbine blades at their tip and at their base and shows that at constant pitch angle, the blade speed may be varied so that the angle of apparent wind matches blade pitch angle. It is believed that maximum power is obtained when apparent wind angle is about 5 degrees less than the pitch angle of the blade.

Figure 20:
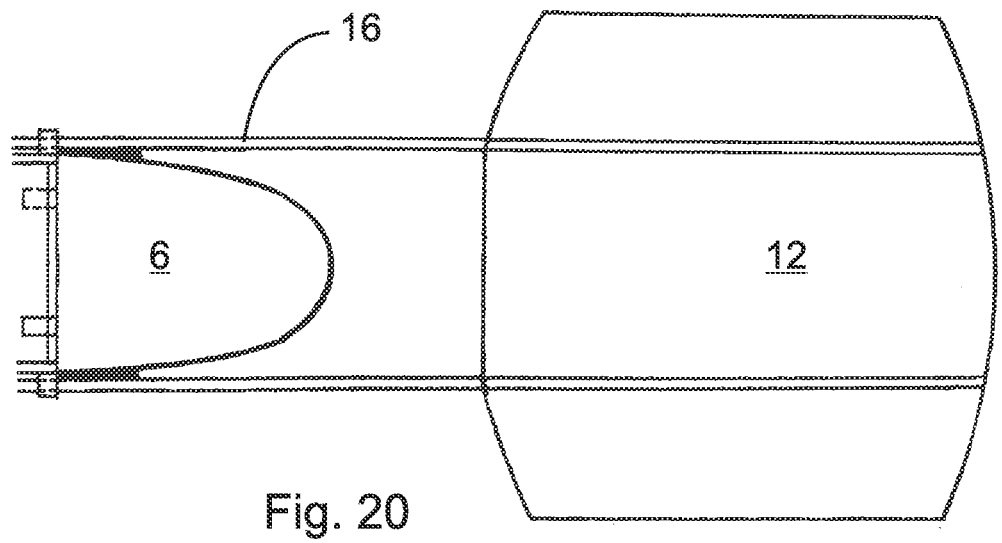
FIG. 20 is a side view of a wind vane and rear cone door assembly of a preferred embodiment of the present invention; and, FIG. 21 illustrates alternative blade shapes of a preferred embodiment of the present invention showing apparatus controlling braking.

FIG. 20 is a side view of the wind vane and the rear cone door assembly of the present invention. Wind vane 12 is secured to main housing 2 by two heavy-duty struts extending back and through the length of the vane. These struts are structurally designed to withstand strong forces on the wind vane as it orients the wind turbine into the wind. Wind vane 12 is constructed of a reinforced plastic sandwich panel with a foam core to be light weight, strong, and slightly flexible. the struts serve a second function as the rails for the rear cone door 6 when it is slid back for access to the control space in the main housing 2. The cone is made of a reinforced plastic constructed in a mold similar to the front cone. The cone is shaped to aerodynamically minimize turbulence and maximize the laminar flow of the wind. The color dye in the plastic resin should match the rest of the wind turbine parts.

Figure 21:
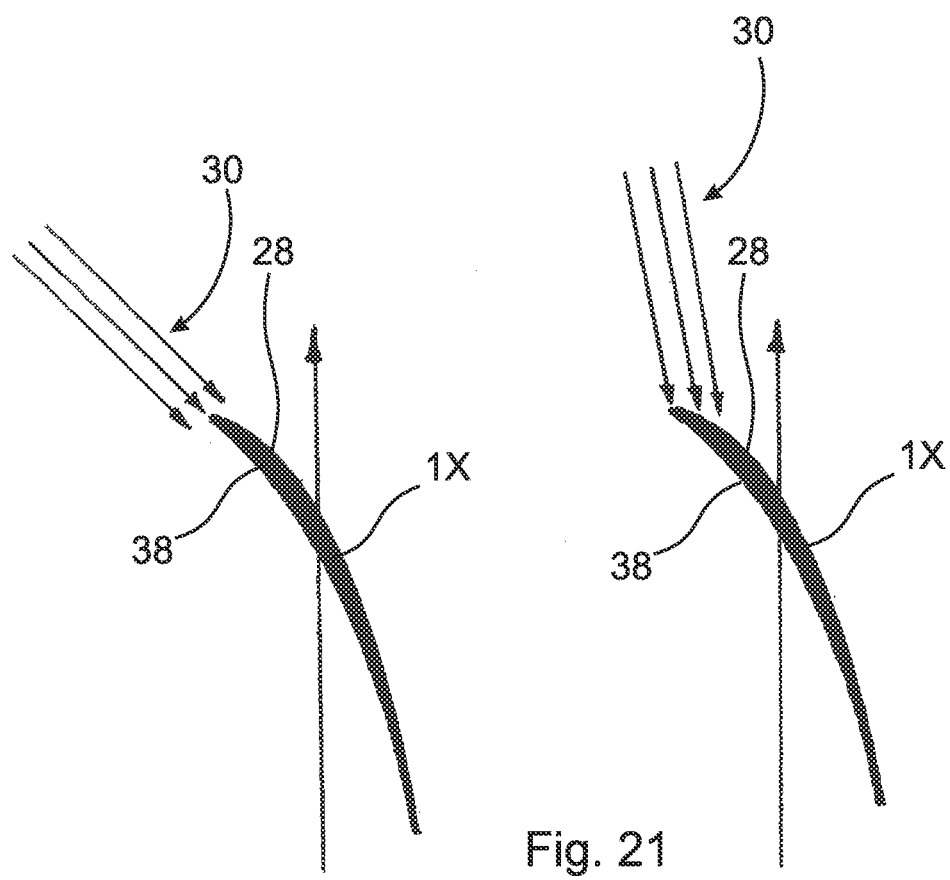
Figure 22:
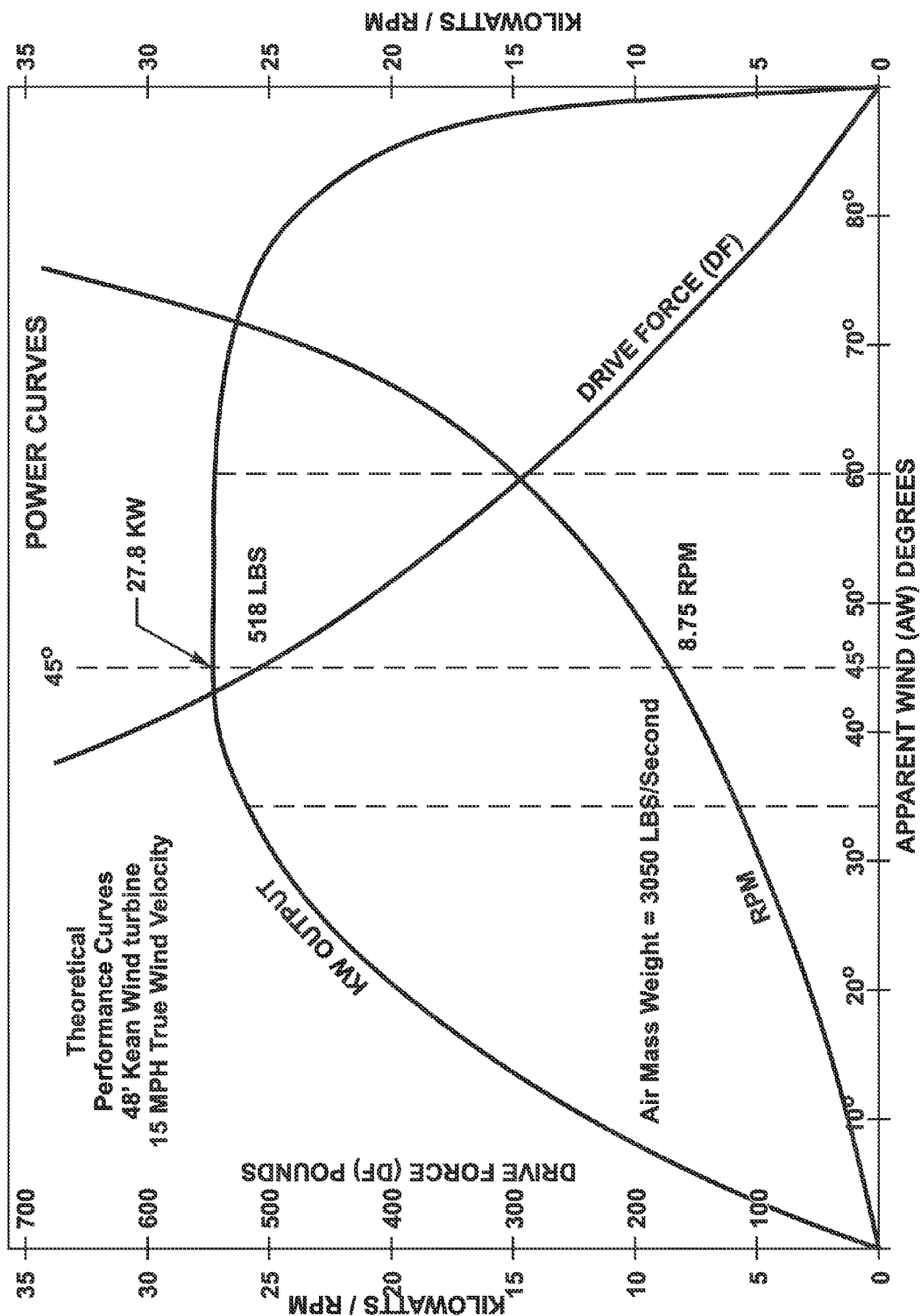
FIG. 22 shows a curve illustrating blade speed, torque and power output relative to blade pitch angle.

FIG. 21 illustrates an alternate shape for turbine blade 1X based on utilizing the backside of the blade to gain some extra advantage. The set of fixed pitch blades are shaped with a curvature on front blade surface 28 and a different curvature on reverse blade surface 38 to affect the apparent wind as seen by the moving blades of said turbine. The figure also shows how apparent wind 30 can back on the blade for self-regulating turbine speed control.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

The present invention, utilizes Newton's First Law Of Linear Motion as a means of extracting energy from the wind. Newton's Law states, essentially, that an object moving in a straight line will continue moving in a straight line unless acted upon by an unbalanced force, By this concept a mass of air, entering the turbine, is forced out of its path of motion by curved fixed pitch turbine blades. This causes a force, which drives the turbine. As the turbine rotates, the moving blades cause an apparent wind that is the vector angle hypotenuse of the triangle between the true wind speed entering the turbine and the peripheral speed of the blades. When the apparent wind angle is caused to be the same as the pitch of the blades, the turbine can deliver maximum power. A controller regulates the output of a generator to load the turbine to control the turbine speed for continuous maximum output for all wind conditions. This concept results in a wind turbine of exceptional efficiency, low cost, and small size.

The present embodiment, by use of the law of physics attributed to Sir Isaac Newton and known as his First Law of Linear Motion, and applying this concept as a means of extracting energy from the wind, and by using special techniques to utilize the concept, provides a new level of high efficiency that surpasses other methods for generating economical electrical power, especially as highly desirable renewable energy. As a result, for equivalent annual power output from the wind, the present embodiment can be one sixth the diameter, and need be mounted only one third to one half as high, at one tenth the cost of the very popular three-blade windmills now proliferating across the world. The smaller size and lower cost opens enormous new markets as it becomes cost effective without government grants, subsidies, or tax abatements. The market for homes, agricultural farms, and small businesses is huge as this wind turbine can supply all of their heat and power at a tiny fraction of current utility costs. It can be easily mounted on top of commercial buildings with little structural modification. There is no other known product available for the markets that can generate the level of power that is required to supply all the heat and electricity for a home or business in such a small unit and at such a low cost. Because the turbine turns at low speeds with the blades enclosed, the rotation is not evident except when up close; there is no television interference, nor flickering shadows.

In a preferred embodiment, overlapping blades provide no apparent opening when viewed straight on; hence, birds will not fly into device more frequently than they would fly into the side of a building. The design provides a turbine that is silent in operation and non-intrusive in appearance. In fact, these turbines, because they are small and can be just above the treetops and, can easily blend into the landscape if properly placed. Because the airflow through the present embodiment is straight through, with virtually no turbulence, these turbines can be placed close together on a rotating platform. Thus, the applications increase as a multiple of turbines can supply a wide variety of user requirements with just one installation on a single pedestal, or on a building, and with no large land requirement.

Because of the small size and high efficiency, the wind turbine can be placed near the user who then avoids the delivery costs of power transmission from wind farms and large power plants. This is an additional major saving since costs of delivering power over a considerable distance are often more than the power itself. The present embodiment may be equipped with battery energy storage of several days, which would be capable of supplying reactive power to the grid for several hours, during peak power requirements, even when the wind is not blowing. This is a major opportunity to enhance the total power generation in the country at the lowest possible cost. The invention is intended to cover embodiments in addition to the preferred embodiments shown in the drawings and described herein.

It is anticipated that in future embodiments, modifications of the blade configuration and the structural flared enclosure may be made. For example, more or fewer blades, with more or less overlapping of the blades would be logical developments in the quest for greater and greater efficiency. Likewise, it is to be expected that a different curvature of the blades might be found that will enhance efficiency.

In like manner, the structural flared enclosure might be improved by providing a curve to the flair in conjunction with a change in the degree of flair, and the depth of the enclosure.

FIG. 21 shows an alternate blade shape that that utilizes the flow of the apparent wind along the backside of each blade. By careful analysis of the interrelated effects of the number of blades, their overlap, their shape and curvature, greater efficiency may be achieved.

Further, within the general concept of the present invention, it is expected that improvements may be made to the nose cone and the rear cone to improve laminar flow of the air stream and directing it as desired for maximum efficiency of the wind turbine.

In an initial test of the wind turbine of the present invention, turbine output was obtained as high as 50% of the kinetic energy of input wind as determined by output torque and turbine speed.

Calculations of apparent wind angle were made using information in FIG. 19 for various conditions.

The graph permits calculation of appropriate leading edge angle of any blade regardless of size at any position along the blade.

The Kean Wind Turbine is of much higher efficiency, as provided, by utilizing a different law of physics. A large scale test model has been constructed and the tests confirm the theoretical expectations. An International Patent Application has been entered, in my name, in the United States Patent Office and this was preceded by a Provisional Patent Application about one year earlier. There are no assignments on this invention.

The new Kean Wind Turbine is at least 25 times more efficient at extracting usable energy from the wind than 3 blade windmills because it utilizes 100% of the air mass versus the 5% utilization by 3 blade windmills, and it does this more efficiently. Further, it can produce power from a much broader range of the wind speed spectrum. It begins generating power with winds of 8 MPH and can operate in 100 MPH winds. Thus it can deliver, in one year, as much as 50 times more megawatt hours of electrical power as a comparable sized 3 blade windmill.

The new Kean Wind Turbine is very rugged with both ends of the fixed pitch turbine blades anchored securely within the turbine. Further, the simple design requires only about 16 basic components, and is easily produced as a low tech assembly operation. It can be one seventh the size of a 3 blade windmill and cost about one tenth as much for the same annual megawatt hour output. It should have a life span of at least 40 years. The operating cost is estimated at less than one cent per kilowatt hour as there is no fuel cost and only minor maintenance once per year.

This new wind turbine is quiet, and its slow rotation is not obvious unless one is up close. Birds will not fly in because there are no obvious openings when looking straight on into the face of the turbine. Thus it does not cast moving shadows or interfere with TV reception. Because it is so much smaller, it can be mounted at one third to one half the height of 3 blade windmills and thus blends easily into the background.

This new wind turbine creates little if any turbulence as the wind air mass enters directly into the face of the turbine and straight out the back. Thus several turbines can be mounted next to each other on one rotating platform. The Kean Wind Turbine can be made in a wide range of sizes beginning with a ten foot diameter turbine that can produce enough power for the average home, and turbines up to 50 feet in Smart Meter Specifications Smart Meters that work in conjunction with the powerful new Kean Wind Turbines, and with Solar Photo Voltaic Systems, must be customized for maximum value to the utility and their customers as these Alternate Power Sources will be equipped with backup battery storage. A utility requires reactive power sources that can instantly react to supply more or less power as the energy demand on the Grid ebbs and flows. Large thermal power plants react very slowly, but Tens of thousands of small Alternate Power Sources, equipped with battery storage, can provide very low cost reactive power near or at the site where the power is used. This is additionally valuable since these Alternate Power Sources do not require the expense of high voltage transmission systems and can reduce some or all of the power distribution costs.

1. The Smart Meter must be able to receive commands from the Grid Computer to know that it should take specific actions:
    a. Determine if power is available from the Alternate Power Source and/or storage system to add power to the Grid to help with peak power needs.
    b. Determine if the Grid should recharge the storage system during periods when Grid power cutback is occurring with lowering power demand.
    c. Know when to terminate power flow from the Alternate Power Source, and/or battery, to the Grid as peak power demand ebbs, or as battery depletion is forecast.
2. Determine when, and if, Grid power is needed to supplement the Alternate Power Source output, in conjunction with the battery storage system, to prevent battery depletion.
3. Be capable of notifying the customer, during peak power periods, of the need to avoid high power usage appliances, or, cut these back automatically, if battery storage is in danger of depletion.
4. The Smart Meter needs to recognize when the Alternate Power Source is providing adequate power for the customers needs as well as recharging the battery storage so that Grid power is not used.

The Smart Meter, essentially a small computer, must be capable of knowing the

A Mathematical Comparison Between Kean Wind Turbines and 3 Blade Windmills

This comparison makes various assumptions which are believed to be realistic and which are discussed in the following detailed data.

1. The blade span (face) area is identical for both wind generators.
2. The blades of a 3 blade windmill have a functional area of 5% of the blade span area.
3. Both wind generators allow 5% of the air mass to be unused as bypassed around the frontal opening of the blade span area.
4. The conversion efficiency of the Kean Wind Turbine has been set at 64%.
5. The conversion efficiency of the 3 Blade windmill has been set at 45% although some data indicate that this may vary between 30% and 40%.
6. The wind speed spectrum has been set according to information by the local weather bureau as follows: The wind blows 25% of the time from 0 to 8 MPh, 36% of the time from 8 to 15 MPH, 32% of the time from 15 to 30 MPH, and 7% of the time at win speeds above 30 MPH. (This will vary from place to place).
7. An average median wind speed has been calculated for each of the above wind speed sectors. These have been used to establish the net power generated in each speed sector for a total average power from each of these wind speed sectors. This establishes the the total megawatt hours per year from each wind generator.
8. A deviation loss has been estimated for each wind generator as being about 2%. This is intended to account for wind fluctuations from gusty winds. This is intended to compensate for a rotor inertia requiring time to come up to speed and inefficiencies caused by fluctuating winds.
9. The various losses for each step in the electromechanical reduction of the rotor horsepower output to usable kilowatt hours output are designated in the sequence in which they occur. These are carefully calculated estimates.

This comparison makes various assumptions which are believed to be realistic and which are discussed in the following detailed data.

1. The blade span (face) area is identical for both wind generators.
2. The blades of a 3 blade windmill have a functional area of 5% of the blade span area.
3. Both wind generators allow 5% of the air mass to be unused as bypassed around the frontal opening of the blade span area
4. The conversion efficiency of the Kean Wind Turbine has been set at 54%.
5. The conversion efficiency of the 3 Blade windmill has been set at 45% although some data indicate that this may vary between 30% and 40%.
6. The wind speed spectrum has been set according to information by the local weather bureau as follows: The wind blows 25% of the time from 0 to 8 MPh, 36% of the time from 8 to 15 MPH, 32% of the time from 15 to 30 MPH, and 7% of the time at win speeds above 30 MPH. (This will vary from place to place).
7. An average median wind speed has been calculated for each of the above wind speed sectors. These have been used to establish the net power generated in each speed sector for a total average power from each of these wind speed sectors. This establishes the the total megawatt hours per year from each wind generator.
8. A deviation loss has been estimated for each wind generator as being about 2%. This is intended to account for wind fluctuations from gusty winds. This is intended to compensate for a rotor inertia requiring time to come up to speed and inefficiencies caused by fluctuating winds.

9. The various losses for each step in the electromechanical reduction of the rotor horsepower output to usable kilowatt hours output are designated in the sequence in which they occur. These are carefully calculated estimates.
10. For the assumptions made, it demonstrates that the Kean Wind Turbine is Comparison Of Identical Sized 9 Meter Wind Generators Kean Wind Turbine Versus 3 Blade Windmill Kean Wind Turbine 3 Blade Windmill SIZE: 9 Meters=29.5275' Cir.=92.763' SIZE 9 Meters=29.5275' Cir.=92.763'
Hub area has cone Hub area=65.3 Sq. Ft.
Face Area 684.77 Sq. Ft. Face Area 684.7−65.3=619.47 Sq. Ft.
Utilization Factor: 0.95=650.53 Sq Ft. Utilization Factor: 0.05×95=29.42 Sq. Ft
Conversion Factor 54% Conversion Factor: 45%

Weighted Spectrum Output 0 to 8 MPH (25% Zero)=0 KW 0 to 8 MPH (25% Zero) 0 KW
8 to 15 MPH (36% 3.21)=1.156 KW 8 to 15 MPH (36%. - - - )=0 KW
15 to 30 MPH (32% 24.17)=7.734 KW 15 to 30 MPH (32%× 0.911)=0.292 KW
30+ MPH (7% 87.96)=6.157 KW 30+ MPH (7% - - - )=0 KW
Weighted Ave. Output=15.047 KW Weighted Ave. Output: 0.292 KW
    15.047×24×365=131.812 MWH  0.292×24×365=2.558 MWH
Megawatt Hours/yr.=131.812 MWH Megawatt Hours/Year=2.558 MWH
Deviation: 2%=129.176 Deviation: 2% 2.507 MWH
Alternator Loss: 12%=113.675 Gear/Altrntr Loss: 19%=2.031"
Down. Time: 0.20% (17.5 hr)=113.447 Down Time 1%(87.6 hr)=2.010"
Control Functions: 1%=112.313 Control Functions: 2%=0.1970"
Electrical Reduction: 15%=95.466 Electrical Reduction: 15%=1.675"
NET OUTPUT: 95.466 MW HOURS NET OUTPUT: 1.675 MW HOURS
Std Atmosphere (Ratio: 57.0) Std. Atmosphere
No Gear Box: Electro/Mech. Loss: 27.5% Uses a gear box Electro/Mech Loss: 34.5%
Conversion Efficiency: 37.2% Conversion Efficiency: 1.40%
Adverse Atmosphere: 85.92 MWH Adverse Atmosphere: 1.5075 MWH
Median Atmosphere: 90.69 MWH Median Atmosphere: 1.5913 MWH
Std. Atmosphere: 32 F, 14.696 Lbs/Sq. in., 0.8071 Lbs/Cu. Ft., g=32.174

DATA CHART FOR THE 18 Meter KEAN WIND TURBINE 1/19/10 FOR DETERMINATION OF CURVES.
BASED ON STD. ATM. AIR DENSITY .08071 AT 51% EFFICIENCY
Area = 2739.068 Sq. ft. 95% = 2602.12 Sq. ft. Circum. = 185.53' at INLET

| MPH | FT./SEC. | H.P. | 54% | KW | 54% | RPM | TORQUE Lb/ft | TORQUE Kilograms |
|---|---|---|---|---|---|---|---|---|
| 5.0 | 7.333 | 1.19 | | .89 | | 4.10 | 51.63 | 23.42 |
| 8.0 | 11.733 | 4.89 | | 3.65 | | 6.57 | 132.39 | 60.05 |
| 10.0 | 14.666 | 9.55 | | 7.12 | | 8.22 | 206.65 | 92.74 |
| 11.0 | 16.133 | 12.71 | | 9.48 | | 9.04 | 250.08 | 113.44 |
| 11.94m | 17.5115 | 16.25 | 17.21 | 12.12 | 12.84 | 9.81 | 294.64 | 133.65 |
| 15.0 | 22.000 | 32.23 | | 24.04 | | 12.32 | 465.32 | 211.07 |
| 23.40m | 34.327 | 122.41 | 129.61 | 91.32 | 96.69 | 19.23 | 1132.24 | 513.58 |
| 25.0 | 36.666 | 149.18 | | 111.29 | | 20.54 | 1291.85 | 585.98 |
| 30.0 | 44.000 | 257.80 | | 192.32 | | 24.64 | 1860.98 | 844.14 |
| 34.0 | 49.866 | 375.27 | | 279.95 | | 27.93 | 2389.86 | 1084.04 |
| 36.0m | 52.800 | 445.47 | 471.68 | 332.33 | 351.87 | 29.35 | 2699.67 | 1224.57 |
| 38.0 | 55.733 | 523.92 | | 390.84 | | 31.22 | 2984.92 | 1353.96 |
| 45.0 | 66.0 | 870.78 | | 649.08 | | 36.97 | 4189.47 | 1900.34 |

Output constant above 38.0 MPH *Median value based on a constant output to 45 MPH

| | | | | | | | | |
|---|---|---|---|---|---|---|---|---|
| 55.0 | 80.666 | 1588.54 | | 1185.05 | | 45.18 | 6253.92 | 2836.78 |
| 60.0 | 88.000 | 2062.41 | | 1538.56 | | 49.29 | 7442.46 | 3375.90 |

$$K.E. = \frac{WVV}{2g}$$

W = 2602.12 × V × .08071
H.P. = K.E. × 1/550
KW = .746 H.P.
54% K.E. = 1.762436 VVV
51% K.E. = 1.66452 VVV
H.P. = .0030264 VVV
54% H.P. = .0032044 VVV $$R.P.M. = \frac{BV \times 60}{Circum}$$

BV = TWV × Tan 60

$$R.P.M. = \frac{TWV \times 1.7321 \times 60}{185.35} = .56016 \text{ TWV (V in Ft/Sec)}$$

$$\text{Torque} = \frac{H.P. \times 33,000}{2 \Pi R \times R.P.M.} = \frac{177.869 \times H.P.}{R.P.M.} \text{Lb/ft.}$$

One Pound = 453.59 Grams

DATA CHART FOR THE 9.0 METER WIND TURBINE BASED
ON STD. ATM. AIR DENSITY .08071 AT 54% EFFICIENCY
Area = 684.77 Sq. ft. 95% = 650.53 Sq. Ft Circum. = 92.763' at INLET

| MPH | FT./SEC. | H.P. | KW | RPM | TORQUE Lb/ft | TORQUE Kilograms |
|---|---|---|---|---|---|---|
| 5.0 | 7.333 | .316 | .236 | 8.22 | 13.60 | 6.17 |
| 8.0 | 11.733 | 1.29 | .965 | 13.14 | 34.73 | 15.75 |
| 10.0 | 14.666 | 2.53 | 1.88 | 16.43 | 54.47 | 24.70 |
| 11.94m | 17.512 | 4.30 | 3.21 | 19.62 | 77.53 | 35.17 |
| 15.0 | 22.000 | 8.53 | 6.36 | 24.65 | 122.41 | 55.53 |
| 20.0 | 29.333 | 20.22 | 15.08 | 32.86 | 217.68 | 98.74 |
| 23.40m | 34.327 | 32.40 | 24.17 | 38.46 | 298.01 | 135.18 |
| 25.0 | 36.666 | 39.48 | 29.46 | 41.08 | 339.97 | 154.21 |
| 30.0 | 44.000 | 68.23 | 50.90 | 49.29 | 489.68 | 222.12 |
| 36.0m* | 52.800 | 117.91 | 87.96 | 59.15 | 705.17 | 319.86 |
| 38.0 | 55.733 | 138.67 | 103.44 | 62.44 | 785.63 | 356.36 |
| 45.0 | 66.000 | 230.28 | 171.79 | 73.94 | 1101.73 | 499.74 |
| 51.5 | 75.533 | 345.18 | 257.50 | 84.62 | 1443.01 | 654.55 |
| 55.0 | 80.667 | 420.46 | 313.66 | 90.37 | 1645.88 | 746.57 |
| 65.0 | 95.333 | 694.00 | 517.73 | 106.81 | 2298.50 | 1042.60 |
| 75.0 | 110.000 | 1066.13 | 795.33 | 123.24 | 3060.24 | 1388.12 |

Output constant above 38.0 MPH
*Median based on constant output to 45 MPH $$K.E. = \frac{WVV}{2g}$$

W = AREA × V × .08071,
W = 650.53 × V × .08071,
W = 52.5 V $$H.P. = \frac{.44061 \times VVV}{550},$$

H.P. = .000801,
KW = .746 × H.P.

$$RPM = \frac{BV \times 60}{CIRC.},$$

$$RPM = \frac{TWV \times TAN\, 60 \times 60}{92.763}$$

RPM = 1.12034 × TWV $$TORQUE\ (LBS) = \frac{H.P. \times 33,000}{CIRC. \times RPM},$$

$$TORQ.\ (LBS) = \frac{353.75 \times H.P.}{RPM},$$

TORQ (KG) = TORQ (LBS) × .4536

The pitch angle of the turbine blade is determined by use of the turbine power curve which plots rotor output power, in horsepower or kilowatts, against the "Apparent Wind Angle"—this being the same as the blade pitch angle.

This graph also plots turbine rotation speed and torque output as a function of the pitch angle. The designer wants lowest possible rotation speed and highest possible torque without sacrificing horsepower output. It will be a compromise.

Determination of the pitch angle must consider the fact that the blade pitch will need to vary from the best angle at the blade tip to the best angle at the blade base at the hub. This establishes a range that can be plotted on the graph that shows the boundaries of torque, rotor speed, and power output. The designer can move this range across the graph to determine the best position to satisfy the various requirements of torque, rotor speed and power output.

The range of the blade pitch angle, from the tip to the base, can be modified by changing the diameter of the turbine nose cone. As the diameter of the nose cone increases, the range of the pitch angle decreases. This is very advantageous—up to a certain maximum nose cone diameter. Thus, the nose cone diameter is part of the overall set of compromises required.

Before a prototype is built, this curve is produced entirely by theoretical factors some of which are not well known, particularly, the fall off of rotor power output as it declines to zero as the pitch angle approaches zero, and also as the pitch angle approaches 90 degrees. Once a prototype is built, these measurements can be accurately determined and some adjustment of the ideal nose cone diameter can be established along with the position of the range as located on the chart.

The current determination for using 60 degrees for the blade tip pitch angle and 34 degrees for the base pitch angle is obvious from the chart. Less obvious is the selection of the nose cone diameter which was established at a size equivalent to 15% of the turbine inlet diameter. This size established the blade pitch at the base

| COMPARISON OF IDENTICAL SIZED 4.5 METER WIND GENERATORS KEAN WIND TURBINE VERSUS 3 BLADE WINDMILL | |
|---|---|
| KEAN WIND TURBINE | 3 BLADE WINDMILL |
| SIZE: 4.5 Meters = 14.76' Cir. = 46.38' | SIZE: 4.5 meters = 14.76' Cir. = 46.38' |
| Hub area has cone | Hub area = 17.1 Sq. Ft. |
| Face Area: 171.2 Sq. Ft. | Face Area: 171.2 − 17.1 = 154.1 Sq. Ft. |
| Utilization Factor: .95 = 162.6 Sq FT | Utilization Factor: .05 × .95 = 7.32 Sq.Ft |
| Conversion Factor 54% | Conversion Factor: 45% |
| WEIGHTED SPECTRUM OUTPUT | |
| 0 to 8 MPH (25% Zero) = 0 KW | 0 to 8 MPH (25% Zero) = 0 KW |
| 8 to 15 MPH (36% .802) = .2887 KW | 8 to 15 MPH (36%.—) = 0 KW |
| 15 to 30 MPH (32% 6.043) = 1.9338 KW | 15 to 30 MPH (32% × .227) = .0725 KW |
| 30 + MPH (7% 21.993) = 1.5394 KW | 30 + MPH (7%—) = 0 KW |
| Weighted Ave. Output = 3.7619 KW × | Weighted Ave. Output = .0725 KW × |
| 24 × 365 = 32.910 | 24 × 365 = .635 |
| Megawatt Hours/yr. = 32.954 MWH | Megawatt Hours/Year = .635 MWH |
| * * * | * * * |
| Deviation: 2% = 32.295 | Deviation: 2% = .622 MWH |
| Alternator Loss: 12% = 28.420 | Gear/Altrntr Loss: 19% = .504 MWH |
| Down Time: .20% (17.5 hr) = 28.363 | Down Time: 1% (87.6 hr) = .499 MWH |
| Control Functions: 1% = 28.079 | Control Functions: 2% = .489 MWH |
| Electrical Reduction: 15% = 23.867 | Electrical Reduction: 15% = .416 MWH |
| NET OUTPUT: 23.867 MW HOURS | NET OUTPUT: .416 MW HOURS |
| Std. Atmosphere | (Ratio: 57.3) Std. Atmosphere |
| No Gear Box: Electro/Mech. Loss: 27.5% | Electro/Mech Loss: 34.5% |
| Efficiency: 37.2% | Efficiency: 1.40% |

-continued

COMPARISON OF IDENTICAL SIZED 4.5 METER WIND GENERATORS
KEAN WIND TURBINE VERSUS 3 BLADE WINDMILL

| KEAN WIND TURBINE | 3 BLADE WINDMILL |
|---|---|
| Adverse Atmosphere: 21.48 MWH | Adverse Atmosphere: .374 MWH |
| Median Atmosphere: 22.67 MWH | Median Atmosphere: .395 MWH |

Std. Atmosphere: 32 F, 14.696 Lbs/Sq.in., .08071 Lbs/Cu. Ft., g = 32.174 Rev. 8/25/10 KWS DATA CHART FOR THE 4.5 METER TURBINE
FOR DETERMINATION OF CURVES.
BASED ON STD. AIR DENSITY .08071 AT 54% EFFICIENCY
Area = 171.2 Sq. ft. (95% = 162.6 Sq. Ft.) Circum. = 46.38' at Inlet

| MPH | FT./SEC. | H.P. | KW | RPM | TORQUE Lb/Ft | TORQUE Kilograms |
|---|---|---|---|---|---|---|
| 5.0 | 7.333 | .079 | .059 | 16.43 | 3.42 | 1.55 |
| 8.0 | 11.733 | .323 | .241 | 26.28 | 8.75 | 3.97 |
| 10.0 | 14.666 | .632 | .471 | 32.85 | 13.69 | 6.21 |
| 11.0 | 16.133 | .841 | .627 | 36.14 | 16.56 | 7.51 |
| 11.94m | 17.5115 | 1.0755 | .802* | 39.24 | 19.50 | 8.85 |
| 15.0 | 22.000 | 2.133 | 1.591 | 49.30 | 30.78 | 13.96 |
| 20.0 | 29.333 | 5.055 | 3.771 | 65.70 | 54.74 | 24.83 |
| 23.40m | 34.327 | 8.101 | 6.043* | 76.92 | 74.93 | 33.99 |
| 25.0 | 36.666 | 9.873 | 7.365 | 82.13 | 85.53 | 38.80 |
| 30.0 | 44.000 | 17.062 | 12.728 | 98.56 | 123.17 | 55.87 |
| 34.0 | 49.866 | 24.834 | 18.526 | 111.70 | 158.19 | 71.75 |
| 36.0m | 52.800 | 29.480 | 21.993* | 117.38 | 178.09 | 80.78 |
| 38.0 | 55.733 | 34.672 | 25.865 | 124.84 | 197.61 | 89.64 |

Output constant above 38.0 MPH
*Median value based on constant output to 45 MPH
m: Median value $$K.E. = \frac{WVV}{2g}$$

W = Area × .95 × V × .08071
H.P. = K.E. × 1/550
54% K.E. = .110157 VVV
H.P. = .00020028 VVV $$R.P.M. = \frac{BV \times 60}{Circum}$$

BV = TWV × TAN 60
BV = TWV × 1.7321
(APW = 60 Degrees)
R.P.M. = TWV × 2.24075

$$Torque = \frac{H.P. \times 33,000}{2 \Pi R \times R.P.M.} = \frac{711.51 \; H.P.}{R.P.M.} Lb/Ft.$$

One Pound = 453.59 Grams
Nov. 25, 2009

A LISTING OF NUMERALS USED IN THE
DRAWINGS IS AS FOLLOWS:

1 turbine assembly
1A turbine blade
1B turbine hub
1C turbine axle
1D structural flared enclosure
1E nose cone
1F wind direction servo
1G disc brake surface
2 main housing
3A forward partition
3B rear partition
4A forward main bearing
4B rear main bearing
5A generator stator
5B generator armature
6 rear cone and door
7 lock down mechanism
8 inverter and power controller
9 upper column
10 main column
10A main column cap
11 column bearings axial and thrust
12 wind vane
12A struts and slider system
13 gear/clutch turning motor
14 slip ring assembly
15 tie down rod system
16 concrete foundation and pad
20 tip end of blade
21 hub end of blade
22 leading edge of blade
23 trailing edge of blade
24 compound curve
25 circumferential sidewall
26 front opening
27 rear opening
28 front blade surface
29 overlap surface
30 apparent wind
31 true wind
32 air mass
33 displacement
34 base
35 tip
36 blade speed
38 reverse blade surface
($\phi$) pitch angle at tip end of blade
($\alpha$) pitch angle at hub end of blade
($\Psi$) slope angle of sidewall
($\theta$) angle between blades

What is claimed is:

1. A wind turbine for operation within a circular area comprising:
   a set of curved blades mounted on a central rotatable hub, each of said blades having a length from the hub to the tip and a wind contact surface defined by a leading edge and a trailing edge and a defined pitch angle, to a rotational axis of the hub, along at least a portion of the blade from the hub to the tip such that said at least a portion of said blade passes through at least 85 percent of said circular area;
   a curve on the wind contact surface along said at least a portion each of said blades having an increasing pitch angle of the blade, over the blade surface from the leading edge of the blade to the trailing edge of the blade by an amount between about 6 and about 24 degrees;
   said defined pitch angle from any point along said leading edge of said at least a portion of said blade being defined by the arc-sine of a ratio of blade velocity to apparent wind velocity, with a variance of ±30 percent of the complementary angle to said arc-sine; and apparatus for controlling the velocity of the blade to control power output so that it is within forty percent of maximum obtainable power under normal wind conditions;

provided that, said pitch angle is at least 20 degrees and not greater than 85 degrees, and provided that the pitch angle closest to the hub, of said at least a portion of the blade, is at least fifteen degrees less than the pitch angle of said at least a portion of the blade most distant from the hub.

2. The wind turbine of claim 1 wherein the apparatus for controlling the velocity of the blade controls the velocity such that velocity and drive force are each within at least 40 percent of maximum.

3. The wind turbine of claim 1 wherein the hub comprises a cone that directs wind to the blades.

4. The wind turbine of claim 3 further comprising an enclosure surrounding the tips of the blades and attached thereto, which enclosure is arranged to rotate with said hub.

5. The wind turbine recited in claim 4, wherein the enclosure has a circumferential sidewall about a central axis, said circumferential sidewall defining a front opening being adapted to face true wind, and a rear opening; said sidewall sloping from said front opening to said rear opening such that the rear opening has a larger diameter than the front opening.

6. The wind turbine recited in claim 5, wherein said sidewall slopes from said front opening to said rear opening at an angle to a plane of said front opening between 100 degrees to 135 degrees.

7. The wind turbine recited in claim 1, wherein the control of turbine speed is regulated by a controller that measures generator power output and modifies field current of the generator to load rotor to regulate rotation speed of the turbine to obtain at least 50% of maximum available power under normal wind conditions.

8. The wind turbine recited in claim 4 having a number of blades sufficient to entirely redirect direct wind impinging upon the turbine.

9. The wind turbine recited in claim 8, wherein the leading edge of each of the blades overlaps the trailing edge of an adjacent blade by an amount between 5% and 60% of its surface area.

10. The wind turbine recited in claim 4, wherein each of said blades is twisted such that the tip end of said blade is twisted at an angle to the central axis of an amount between 58 degrees to 64 degrees.

11. The wind turbine recited in claim 10, wherein each of said blades is twisted such that the hub end of said blade is twisted at an angle to the central axis of an amount between 28 degrees to 49 degrees.

12. The wind turbine recited in claim 4, wherein the nose cone is provided at the front of the turbine face covering the hub, and is streamlined to transfer an air mass, approaching the turbine, to be directed around said hub and into said blades so that kinetic energy in said air mass is captured.

13. The wind turbine recited in claim 1 wherein, the turbine is connected to a multi-pole generator having a rotor and having poles connected in series and of sufficient size to provide a higher output voltage relative to the output of a dipole generator.

14. The wind turbine recited in claim 13, wherein the control of turbine speed is regulated by a controller that measures generator power output and modifies field current of the generator to load rotor to regulate rotation speed of the turbine to obtain at least 40% of maximum available wind power under normal wind conditions.

15. The wind turbine recited in claim 14, wherein the control of turbine speed is regulated by a controller that measures generator power output and modifies field current of the generator to load rotor to regulate rotation speed of the turbine to obtain at least 80% of maximum generated power output under normal wind conditions.

16. The wind turbine recited in claim 15, wherein an inverter is connected to the generator output with apparatus to provide the maximum electrical output of the generator under all normal wind conditions for delivery to the user.

17. The wind turbine recited in claim 4, wherein said set of fixed pitch blades are shaped with a curvature on a front blade surface and a different curvature on a reverse blade surface to affect the apparent wind as seen by the moving blades of said turbine.

18. The wind turbine recited in claim 9, wherein the leading edge of each of the blades overlaps the trailing edge of an adjacent blade by an amount between 14% and 20% of its surface area.

19. A wind turbine comprising:

a set of curved blades mounted on a central rotatable hub, each of said blades having a length from the hub to the tip and a wind contact surface defined by a leading edge and a trailing edge and a defined pitch angle, to a rotational axis of the hub, along the blade from the hub to the tip;

a curve on the wind contact surface along each of said blades over the blade surface from the leading edge of the blade to the trailing edge of the blade by an amount between about 6 and about 24 degrees;

said defined pitch angle from any point along said leading edge being defined by the arc-sine of a ratio of blade velocity to apparent wind velocity, with a variance of ±30 percent of the complementary angle to said arc-sine; and apparatus for controlling the velocity of the blade to control power output so that it is within forty percent of maximum obtainable power;

provided that, said pitch angle is at least 20 degrees and not greater than 85 degrees, and provided that the pitch angle closest to the hub is at least fifteen degrees less than the pitch angle most distant from the hub.

20. The wind turbine of claim 1 where normal wind conditions are between 8 and 30 MPH.

* * * * *